United States Patent
Schöb

[11] Patent Number: 6,130,494
[45] Date of Patent: Oct. 10, 2000

[54] MAGNETIC BEARING APPARATUS AND A METHOD FOR OPERATING THE SAME

[75] Inventor: Reto Schöb, Volketswil, Switzerland

[73] Assignees: Sulzer Electroncis AG, Winterthur, Switzerland; Lust Antriebstechnik GmbH, Lahnau, Germany

[21] Appl. No.: 09/011,660

[22] PCT Filed: Aug. 19, 1996

[86] PCT No.: PCT/CH96/00286

§ 371 Date: Feb. 12, 1998

§ 102(e) Date: Feb. 12, 1998

[87] PCT Pub. No.: WO97/07340

PCT Pub. Date: Feb. 27, 1997

[30] Foreign Application Priority Data

Aug. 18, 1995 [CH] Switzerland ............................ 2367/95
Jul. 30, 1996 [EP] European Pat. Off. .............. 96810507

[51] Int. Cl.$^7$ ..................................................... F16C 39/06
[52] U.S. Cl. ............................................................. 310/90.5
[58] Field of Search ............................................. 310/90.5

[56] References Cited

U.S. PATENT DOCUMENTS

| | | | |
|---|---|---|---|
| 3,877,761 | 4/1975 | Boden et al. | 310/90.5 |
| 4,732,353 | 3/1988 | Studer | 244/165 |
| 4,794,290 | 12/1988 | Nagasaka | 310/90.5 |
| 5,066,879 | 11/1991 | Yamamura | 310/90.5 |
| 5,111,102 | 5/1992 | Meeks | 310/90.5 |
| 5,703,423 | 12/1997 | Fukao et al. | 310/90.5 |

FOREIGN PATENT DOCUMENTS

| | | | |
|---|---|---|---|
| 0 191 225 | 8/1986 | European Pat. Off. | F16C 32/04 |
| 0 612 928 A1 | 8/1994 | European Pat. Off. | F16C 39/06 |
| 23 58 527 | 5/1975 | Germany | H02K 5/16 |
| 24 06 790 | 9/1975 | Germany | H02K 5/16 |
| WO 90/14525 | 11/1990 | WIPO | F16C 39/06 |
| WO 95/05700 | 2/1995 | WIPO | H02K 7/09 |

*Primary Examiner*—Nestor Ramirez
*Assistant Examiner*—Burt Mullins
*Attorney, Agent, or Firm*—Townsend and Townsend and Crew LLP

[57] ABSTRACT

The invention relates to an apparatus for the contact-free journalling of a rotor by rotary field machine stators. The rotary field machine stators are magnetically coupled, on the one hand, via the rotor of ferromagnetic material and, on the other hand, via a flux conduction ring of a ferromagnetic material and/or a housing of a ferromagnetic material. The radial magnetic bearing forces in the rotary field machine stators are produced in that means are present in the arrangement which produce magnetic unipolar fluxes flowing through the rotary field machine stators. Two-pole control fluxes are superimposed on the unipolar fluxes in the rotary field machine stators, and the control fluxes are controlled by the currents in two-pole rotary field windings. The position of the rotor is measured by position sensors. A control apparatus calculates the required phase currents as a result of the position signals and feeds the rotary field windings in such a manner that the rotor is held in suspension.

40 Claims, 20 Drawing Sheets

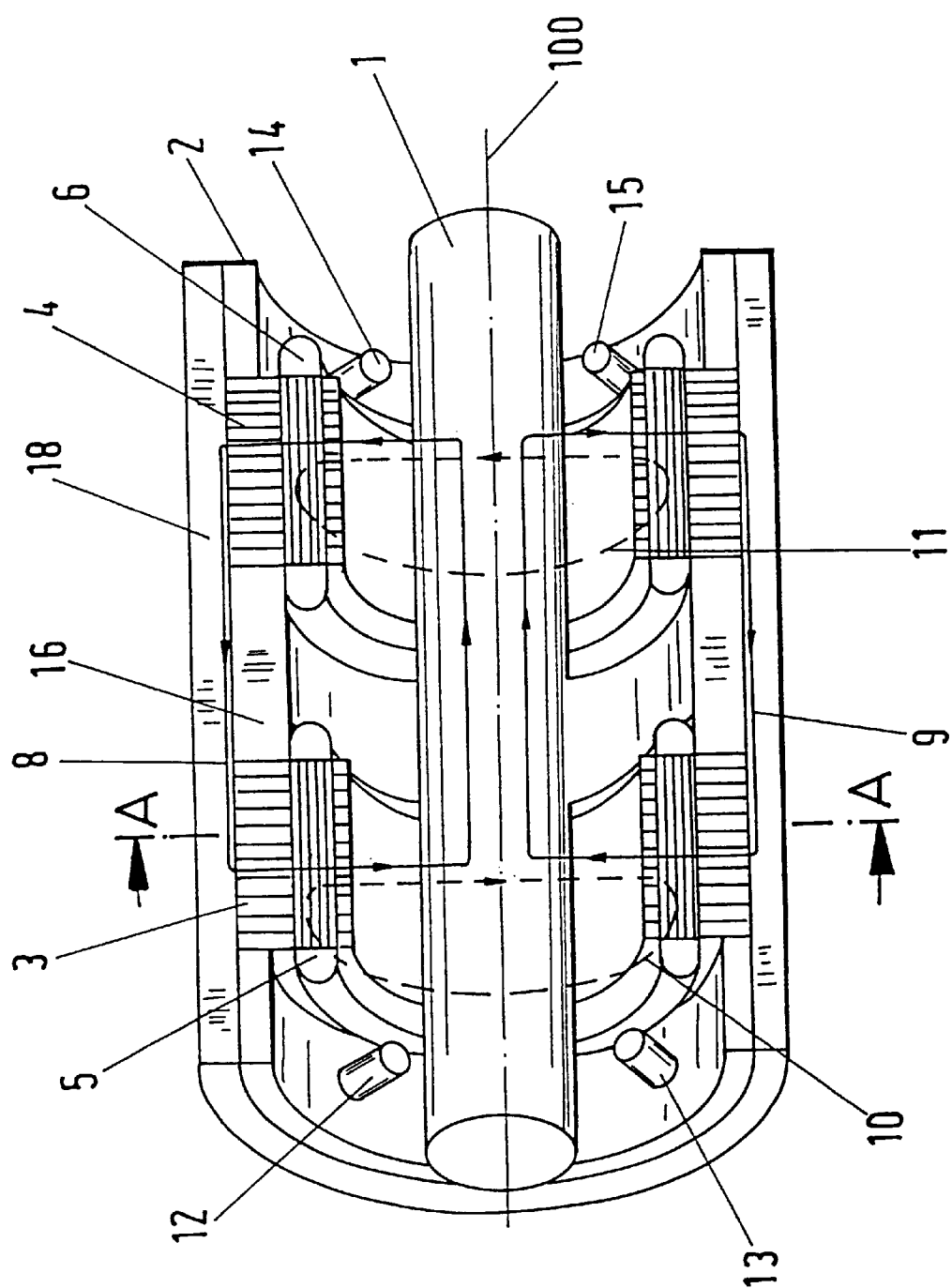
Fig.1
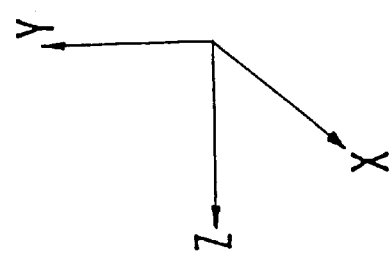

Fig.1a
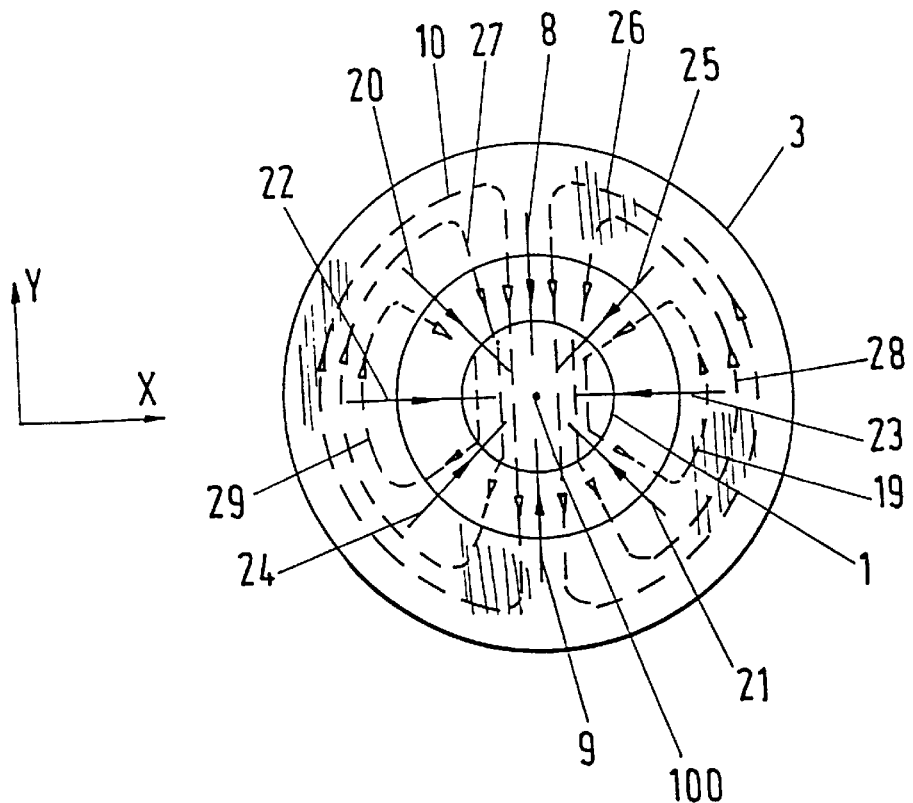
Fig. 1b
Fig. 1c
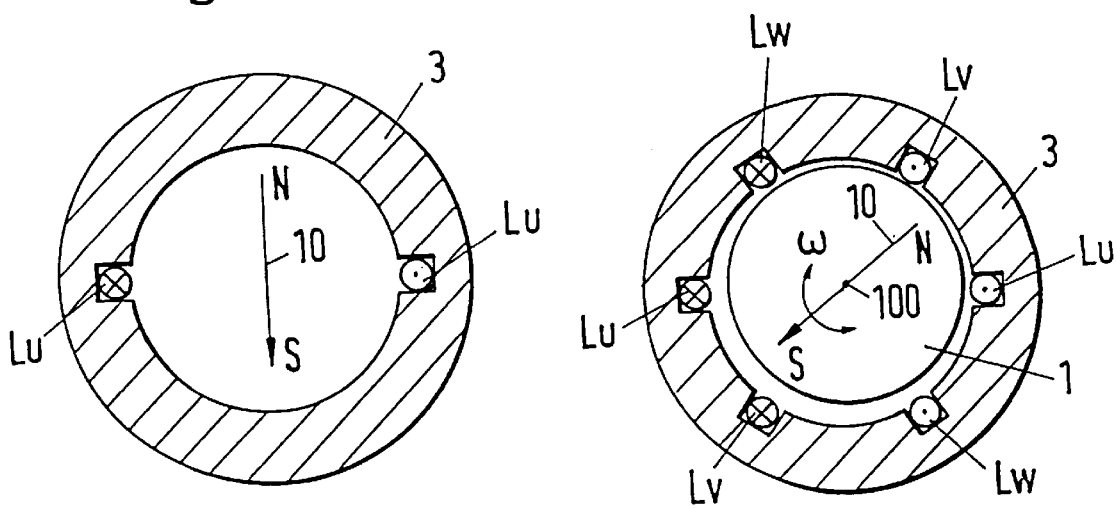

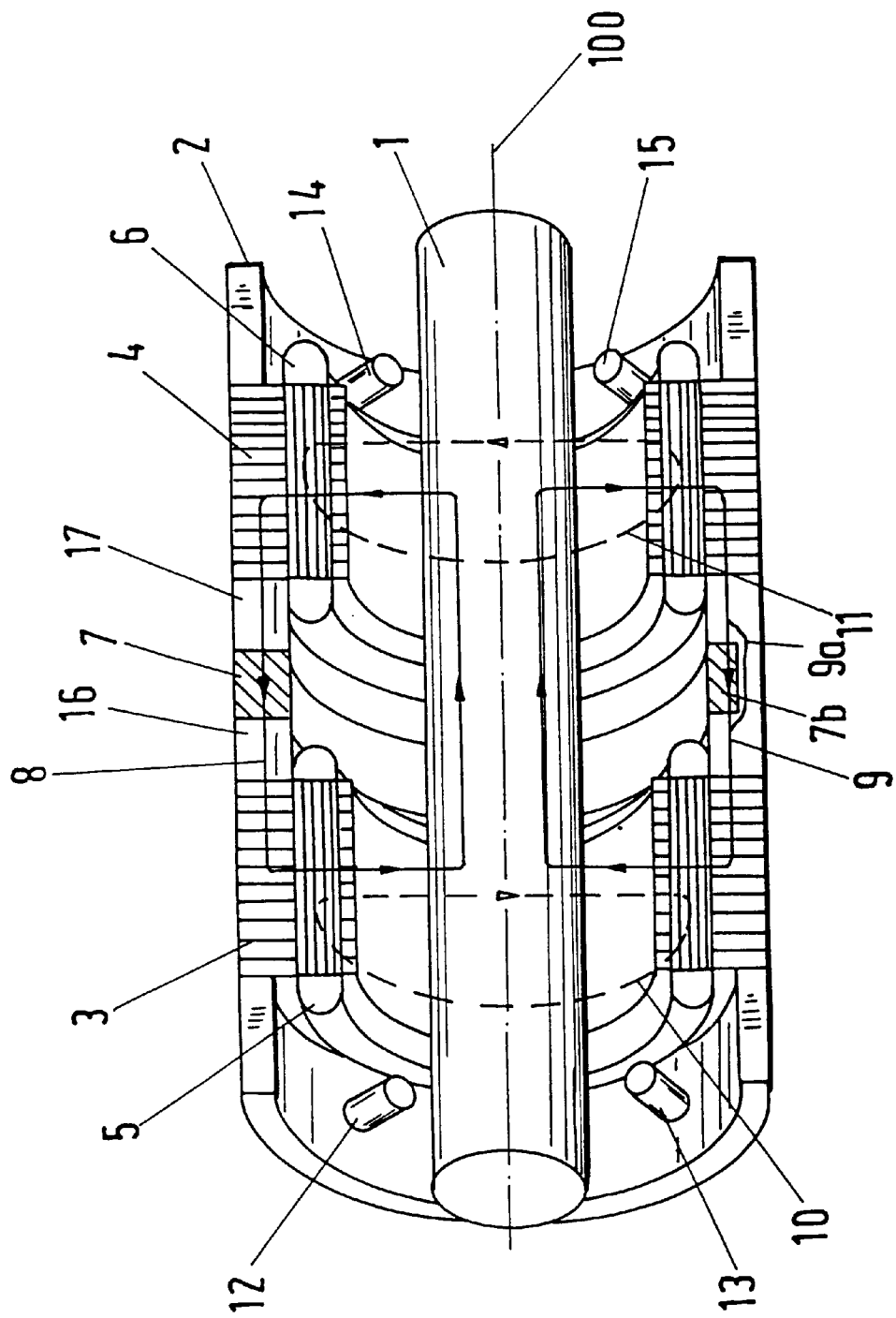
Fig.3
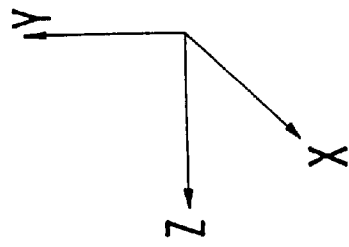

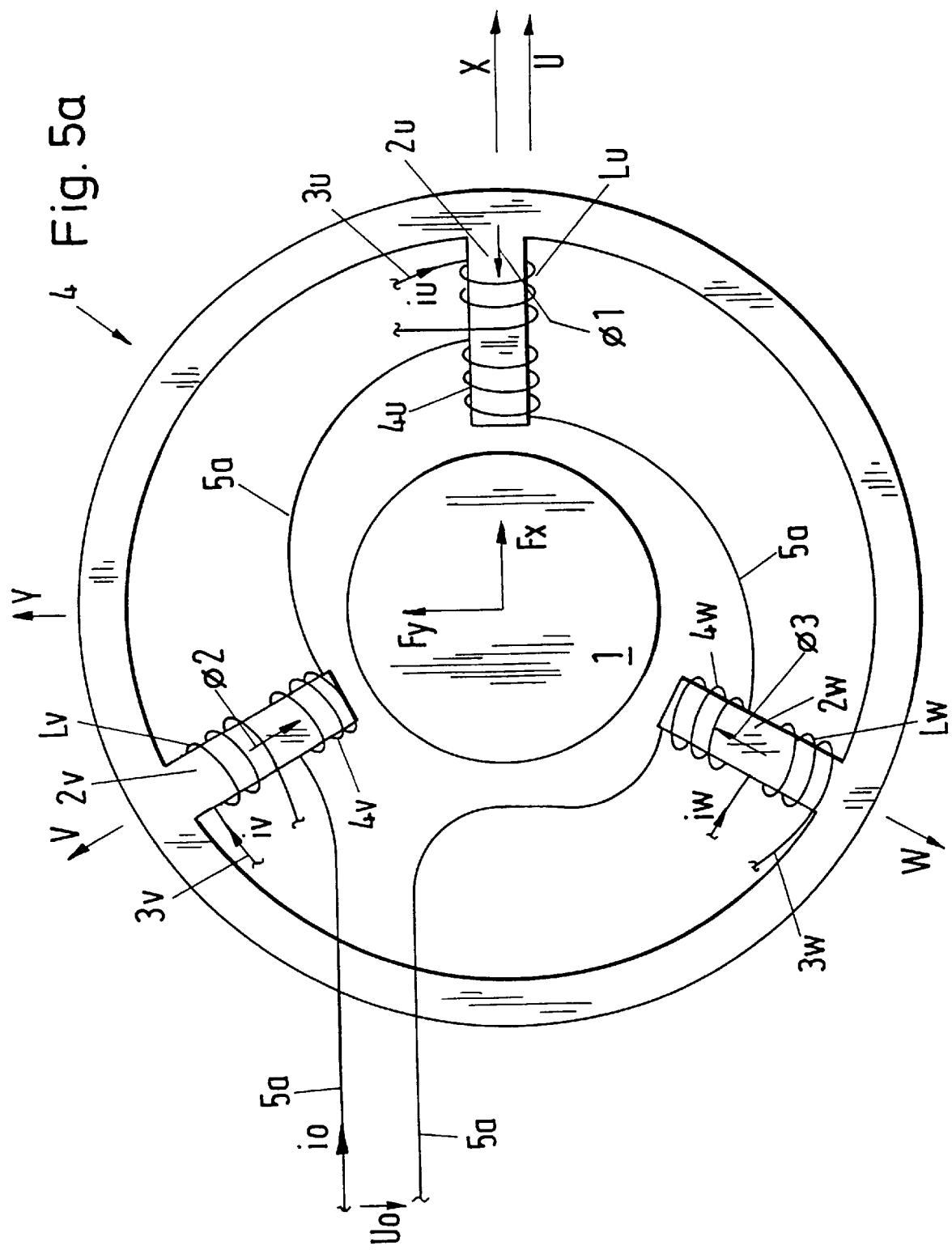

Fig. 8a (A-A)

MAGNETIC BEARING APPARATUS AND A METHOD FOR OPERATING THE SAME

BACKGROUND OF THE INVENTION

The invention relates to a magnetic bearing apparatus and to a method for operating the same in accordance with the preamble of claim 19.

It is known from EP 0 612 928A to use active magnetic bearings for the contact-free journalling of rotors. The principle of the active magnetic bearing is based on the attractive force of regulatable electromagnets on a ferromagnetic rotor. In order to determine the position of the rotor in the radial direction, three U-shaped electromagnets are distributedly arranged over the periphery of the rotor. These three magnet pairs form a so-called radial bearing. In a manner similar to a ball bearing, the radial bearing can hold the rotor fixed at one location in a plane (x–y direction). Since a tilting of the rotor must often also be prevented, the latter is preferably held by two radial bearings arranged at different locations.

This known magnetic bearing apparatus has the disadvantage that the electromagnets are designed in the shape of a U. Therefore this bearing apparatus has a larger number of pole changes over its periphery, which causes increased eddy current losses. A further disadvantage of the known bearing apparatus is to be seen in the fact that the electromagnets are specially manufactured and correspondingly expensive; and in that an individual, special power amplifier is required for each U-shaped electromagnet so that a total of three separate direct current controllers are required for the operation of a radial magnetic bearing.

SUMMARY OF THE INVENTION

The object of the present invention is to provide an economically more advantageous magnetic bearing apparatus.

The object is satisfied in particular by a magnetic Maxwell bearing apparatus for a magnetizable body, in particular a rotatable shaft, with the bearing apparatus comprising at least one rotary field machine stator with a two-pole rotary field winding, with the two-pole rotary field winding being of three, phase design, and with the at least one rotary field machine stator forming a stator, and with the bearing apparatus having first means which produce a unipolar flux in the rotary field machine stator. These first means can for example be designed as an axial coil or as a permanent magnet.

In an advantageous embodiment of the invention the magnetic bearing apparatus comprises two rotary field machine stators which are arranged so that they are displaced in an axial direction with respect to the magnetically suspended rotatable shaft so that a stator with two spaced-apart, active magnetic bearing positions is formed in this manner in order to hold the shaft without contact using magnetic forces.

In the present discussion the term rotary field machine stator is understood to denote an arrangement known from the technical field of electrical machinery, namely a stator with electrical windings for the production of a magnetic field, with it being possible to produce a rotary magnetic field through the number and position of the windings in the stator and with appropriate excitation. A two-pole field is understood to mean a two-pole magnetic field extending in the radial direction within the rotary field machine stator as illustrated in FIG. 1b. A two-pole rotary field winding is understood to mean a winding which is designed in such a manner and can be excited in the rotary field machine stator in such a manner that a two-pole rotating magnetic field can be produced in the rotary field machine stator. For the production of a rotary field in a rotary field machine stator, windings with at least two different phases, i.e. with different excitations, are required. In a preferred embodiment the rotary field winding of the rotary field machine stator is of three-phase design, i.e. with three current branches. A two-pole, rotating magnetic field can be produced in a rotary field machine stator, and the rotational frequency can also be zero, so that the two-pole magnetic field stands still or is stationary. The direction of this two-pole stationary magnetic field, which extends in the radial direction in the rotary field machine stator, can be predetermined for any angle desired through a corresponding excitation of the three-phase rotary field winding in the peripheral direction of the rotary field machine stator. In the present considerations a rotary field machine stator is generally understood to mean an arrangement for the production of a two-pole rotating magnetic field, with it being possible to design a rotary field machine stator of this kind in a large number of possible embodiments.

An advantage of the present invention is to be seen in the fact that a commercially available rotary field machine stator which is manufactured for an electrical machine can also be used as a rotary field machine stator for the manufacture of the magnetic bearing apparatus in accordance with the invention. A magnetic bearing apparatus of this kind can be manufactured very economically.

A further advantage of the magnetic bearing apparatus in accordance with the invention is to be seen in the fact that a commercially available, inexpensive converter suffices for the excitation of the rotary current winding of a rotary field machine in order to provide the rotary current winding with a current of any desired amplitude and frequency. In particular a conventional three-phase rotary current controller or a three-phase converter can be used as a rotary current controller. These rotary current controllers are a standard product for the excitation of electrical machines, for which reason a rotary current controller of this kind can be obtained very economically. The rotary current controller can also produce a rotary field with a frequency of 0, that is, a stationary magnetic field, with it being possible to freely predetermine the angle of rotation of the field or the phase. The sum of the currents at the star point is 0 since the coils are coupled to one another.

A further advantage is to be seen in the fact that a conventional, three-phase rotary current controller usually has an integrated micro-controller which can be used for control tasks. To use the rotary current controller as an excitation device for an active magnetic bearing—a correspondingly adapted control procedure is required, which can usually be loaded into the micro-controller of the rotary current controller in the form of program lines (software). Thus the signal processing, which is complicated and expensive per se, can largely be carried out by the micro-controller which is integrated in the rotary current controller, which saves the costs for an additional signal processing apparatus.

The active, magnetic bearing in accordance with the invention can be designed as an inner rotor, i.e. with an inwardly disposed rotor, or as an outer rotor, i.e. with a rotor surrounding the electromagnets outwardly. The active magnetic bearing requires a bias magnetization, which can be produced by a permanent magnet or by a coil with a direct current component.

In a further advantageous embodiment of the invention the magnetic bearing apparatus has second means which couple the rotary field machine stators magnetically to one another. These second means can, for example, be flux conducting parts and/or a housing of a ferromagnetic material which couple or couples the two rotary field machine stators magnetically to one another.

In an advantageous variant the magnetic bearing apparatus consists of two rotary field machine stators with two-pole rotary current windings which are arranged displaced in a direction axial to the rotor and rotationally symmetrically with respect to the rotor. The rotor consists of a ferromagnetic material. The two rotary field machine stators are coupled magnetically to one another by means of flux conduction parts and/or a housing of a ferromagnetic material such as, for example cast iron or steel. A magnetic unipolar flux can be produced through a direct current component in at least one of the rotary current windings, or through an axial coil or through a permanent magnet, which is directed to pass rotationally symmetrically inwardly in the air gap of the one rotary field machine stator, i.e. out of the stator and into the rotor, and rotationally symmetrically outwardly in the air gap of the other, i.e. out of the rotor and into the stator. The magnetic unipolar flux circuit is closed in the direction axial to the rotor, on the one hand, via the rotor itself, and, on the other hand, via the flux conduction parts and/or the housing of ferromagnetic material. If a rotary field machine stator with a three-phase rotary current winding is used and the magnetic unipolar flux is produced by this rotary current winding, then a loadable star point is required for this as a result of the direct current component, since a star point current flows. The direct current component in the three-phase winding thus forms the first means for the production of the unipolar flux. In addition to the magnetic unipolar flux a two-pole magnetic field can be produced in each rotary current winding by a current flowing through the rotary current winding, designated in the following as a radial control flux. Apart from the magnetic saturation—the radial control flux of each rotary current winding can take on any desired magnitude and any desired radially extending direction by appropriate excitation. The two magnetic radial control flux circuits present with two rotary field machine stators close in the radial direction via the respective rotary field machine stators and the region of the rotor surrounded by the latter. The radial control flux circuits of each rotary field machine stator are completely decoupled from one another and can be adjusted via the rotary current component of the rotary current windings, and the rotary frequency can also be 0. In accordance with the principle of field oriented regulation, a flux vector with any desired magnitude and any desired direction can be produced in the rotary field machine stator via the rotary field winding. The magnetic unipolar flux and the radial control flux mutually reinforce each other where they point in the same direction and weaken each other where they point in opposite directions. Through the central asymmetry of the magnetic fields resulting therefrom, magnetic attraction forces acting in the radial direction act on the rotor in the region of the rotary field stators. Since these attraction forces can be freely excited and controlled in magnitude and direction, they can be used as magnetic bearing forces. The unipolar flux is preferably held constant, but can however be changed as well for the adjustment of the bearing parameters.

In a further embodiment of the invention the magnetic unipolar flux of the magnetic bearing apparatus is not produced by a direct current component in the rotary current windings but rather by a separate axial coil or by permanent magnets which are magnetically coupled to the rotary field machine stator. An advantage of this embodiment is that for the preferred case of three-phase rotary current windings no loadable or current delivering star point is required since the sum of all three phase currents is always=0. Furthermore, the copper losses associated with the production of the unipolar flux do not arise in the rotary current machine stators, for which reason higher control currents for the radial control fluxes and thereby higher bearing forces can be achieved with the same thermal design. In the case of a permanent magnetic excitation of the unipolar flux no losses occur at all.

A particularly simple embodiment of a magnetic bearing apparatus can be obtained if the rotary field machine windings are formed with three discrete coils, one per phase, with an embodiment of this kind being designated in the theory of electrical machines as a 3T embodiment. The discrete coils can be wound outside the stator and subsequently inlaid into the latter as a whole. The named construction permits small winding heads in addition, for which reason it is of particular advantage in the event of restricted axial dimensions.

If the rotary current windings of the two rotary field machine stators are connected in parallel or in series with opposite winding senses, then the radial magnetic forces always point in the same direction in both stators. A radial magnetic bearing can be formed with an arrangement of this kind. An arrangement of this kind makes sense above all in the previously described embodiment of rotary field machine stators with only three discrete coils in a 3T arrangement. In this embodiment a radial magnetic bearing with small axial dimensions can be realized. The space present in the axial direction between the two rotary field machine stators, which is determined by the winding heads, can be used for the arrangement of position sensors for the measurement of the rotor position. The advantage of an arrangement of this kind lies, aside from the saving of space, in the agreement between the location of the position measurement and the location of the average force development.

A passive axial magnetic bearing can be achieved in addition to the active radial magnetic bearing as a result of the reluctance forces which arise by the diameter of the rotor being chosen slightly greater in the region of the rotary field machine stators than in the remaining region. This effect can be further enhanced through additional concentric slits in the rotor and in the stators.

The above-described passive axial magnetic bearing of the rotor has only a slight stiffness and damping. A further advantageous embodiment of the invention is to be seen in the fact that for the two rotary field machine stators two separate, mutually oppositely directed unipolar flux circuits are built up. The two unipolar fluxes are conducted axially via flux conduction elements in the stator into a ring of ferromagnetic material which is firmly connected to the rotor and arranged between the rotary field machine stators. This ring is called the axial bearing disc in the following. The two unipolar fluxes are guided radially from the axial bearing disc to the rotor and are closed via the latter to the rotary field machine stators. As described above, radially acting magnetic bearing forces can be produced via the rotary field machine stators. A further control flux, called the axial control flux in the following, can now be produced via an additional ring coil which is arranged in the stator between the flux conduction elements and which extends concentrically to the shaft. This additional ring coil will be called the axial ring coil in the following. The axial control flux closes via a flux conduction ring which is arranged concentrically to the coil between the flux conduction elements, via the flux conduction elements and axially via the axial bearing disc. The two unipolar fluxes now enter on both sides of the axial bearing disc passing in the perpendicular direction into the latter. The axial control flux enters the axial bearing disc perpendicularly on the one side and exits perpendicularly at the other side. At the one side of the axial bearing disc the axial control flux thus reinforces the unipolar flux and on the other side the axial control flux weakens the unipolar flux. An axially directed magnetic force of attraction which points in the direction of the higher flux density thus acts on the axial bearing disc. The axially directed magnetic force of attraction can be controlled in magnitude and sign via the current in the axial ring coil. An active axial magnetic bearing of the rotor becomes possible through a higher level position regulation.

A further advantageous embodiment of the invention is to be seen in that, as described above, two unipolar flux circuits are built up which, however, extend up to the rotor not via an axial magnetic bearing but rather via a switched reluctance motor (designated in English as a "permanent magnet biased switched reluctance motor"), via a synchronous reluctance motor or via a stepping motor which is arranged between the rotary field machine stators. The reluctance motor or stepping motor is then magnetically biased by the unipolar flux.

In a further advantageous embodiment of the arrangement in accordance with the invention the rotor is covered in the region of the two stators with a direct current layer, by means of which it is possible in addition to the bearing forces to produce a torque in accordance with the principle of the unipolar motor. An arrangement of this kind has the disadvantage that the direct current must be supplied to the rotor via slip rings. An arrangement of this kind can be used in applications in which no absolute freedom of contact between the rotor and the stator is present anyway, e.g. for the journalling and driving of anodes in X-ray tubes.

A further advantageous embodiment of the invention resides in an arrangement in which, in addition to the two-pole rotary field winding which is used for the control of the radial magnetic bearing forces, a rotary current winding with a number of pole pairs greater than or equal to three is to be embedded into the rotary field machine stators. Through this rotary current winding a rotary field can be produced which produces no radial forces or only insignificant radial forces on the rotor under certain conditions even during interaction with the unipolar magnetic field and the two-pole radial control field. If now the rotor is provided with a short circuit winding of the same number of pole pairs, then the former can be driven via the rotary field in accordance with the principle of an induction motor. The rotor can likewise be driven with a permanent magnetic rotor or with a reluctance machine rotor with the same number of pole pairs.

BRIEF DESCRIPTION OF THE DRAWINGS

FIG. 1 illustrates the basic principle of the magnetic bearing apparatus in accordance with the invention with two rotary field machine stators;

FIG. 1a illustrates a cross-section through a rotary field machine stator along the line (A—A) and the corresponding unipolar flux lines and radial control flux lines;

FIG. 1b illustrates a cross-section through a rotary field machine stator with a two-pole magnetic field;

FIG. 1c illustrates a cross-section through a rotary field machine stator with a two-pole rotary field winding which is of three-phase design.

FIG. 3 illustrates a further embodiment of the magnetic bearing apparatus with a permanent magnet for the production of the unipolar flux;

FIG. 5a illustrates a further embodiment of a magnetic bearing apparatus;

FIG. 8a illustrates a cross-section through FIG. 8 along the line A—A;

DESCRIPTION OF THE PREFERRED EMBODIMENTS

Figure 2:
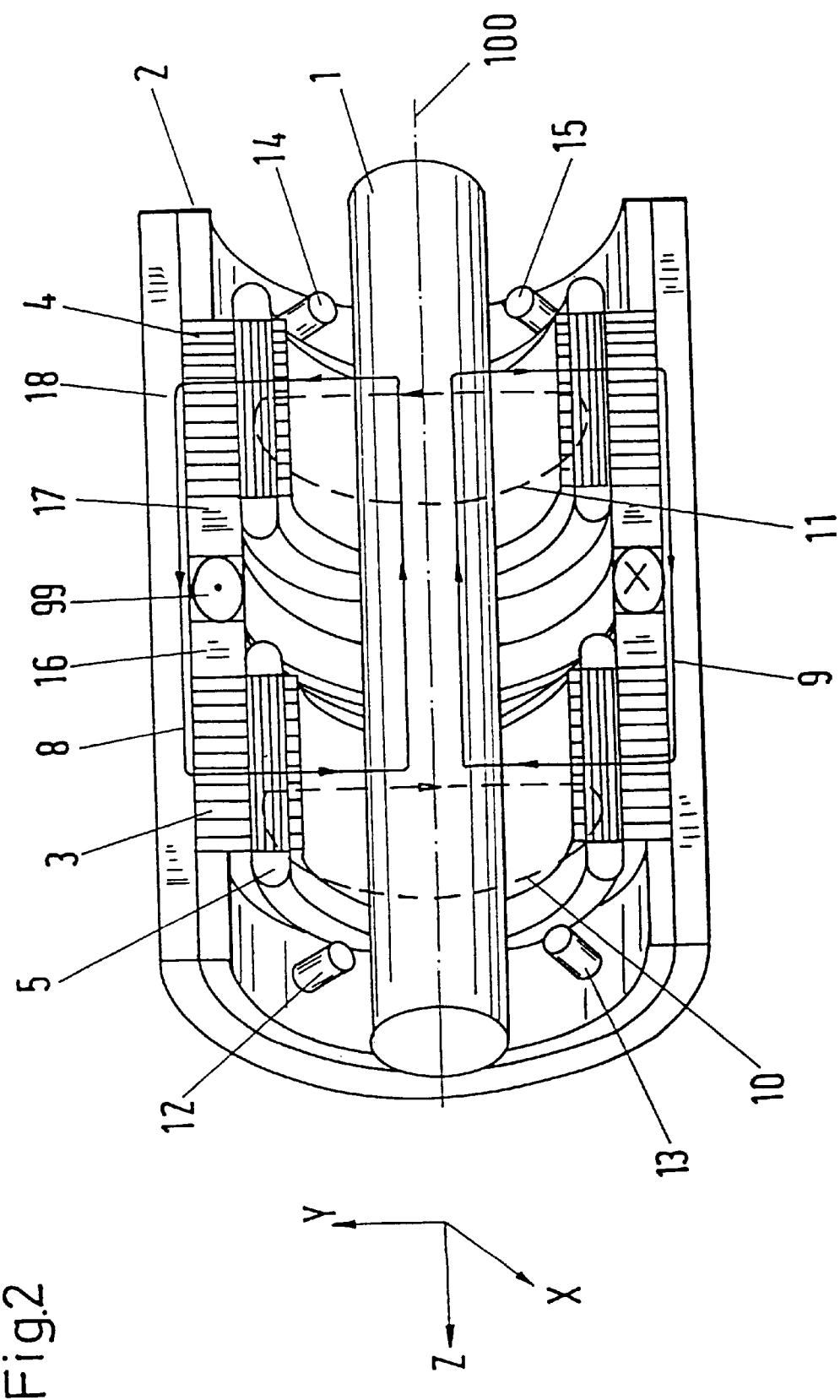
FIG. 2 illustrates a further embodiment of the magnetic bearing apparatus with an axial ring coil for the production of the unipolar flux.

FIG. 1 shows an exemplary embodiment of the magnetic bearing apparatus in accordance with the invention for a rotor 1. All parts are rotationally symmetrically arranged about the axis of rotation 100. The two rotary field machine stators 3, 4 are magnetically coupled, on the one hand, via the rotor 1 of a ferromagnetic material and, on the other hand, via a flux conduction ring 16 of a ferromagnetic material or the housing 18 of a ferromagnetic material. A unipolar magnetic flux is produced by a direct current component in the rotary current winding 5 and/or in the rotary current winding 6. This flux is indicated by the two unipolar flux lines 8 and 9. The unipolar flux points rotationally symmetrically inwardly in the air gap of the rotary field machine stator 3 and rotationally symmetrically outwardly in the air gap of the rotary field machine stator 4. This arrangement will be made clear again in FIG. 1a.

Figure 10:
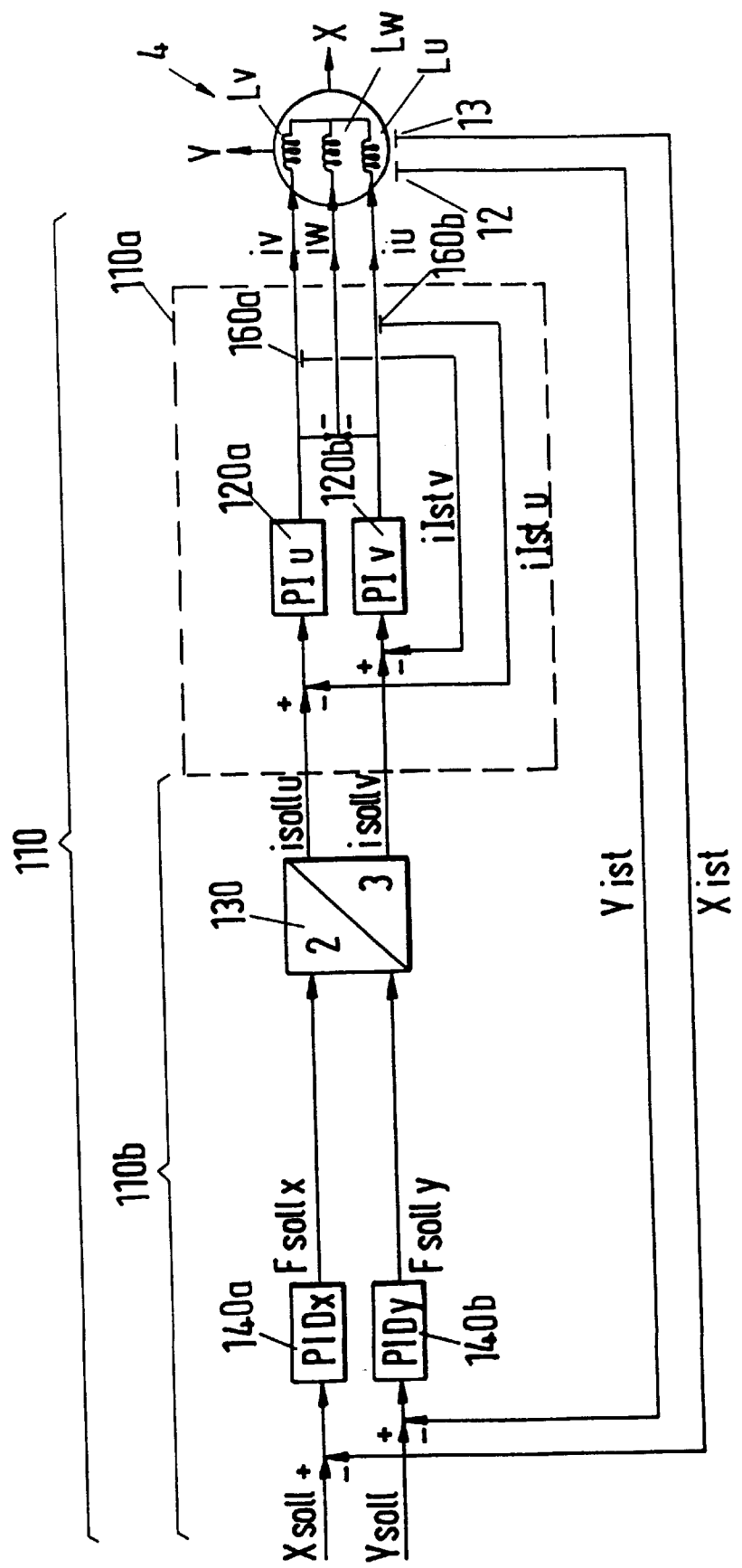
FIG. 10 illustrates a control apparatus for the regulation of the rotary field windings of the magnetic bearing apparatus.

FIG. 1a shows a section along the line A—A in FIG. 1 extending perpendicular to the rotor 1 through the rotary field machine stator 3 and through the rotor 1. The electric conductors of the rotary current winding 5 which are located in the rotary field machine stator 3 are not shown. In addition to the unipolar flux lines 8 and 9, further unipolar flux lines 20, 21, 22, 23, 24, 25 are illustrated, all of which point inwardly from the rotary field machine stator 3 to the rotor 1. In addition to the magnetic unipolar flux, sinusoidally distributed two-pole radial magnetic control fluxes, also called control fluxes, can be produced via the two-pole rotary field windings 5 and 6. Apart from magnetic saturation these can take on any desired magnitude and any desired direction. They are illustrated in FIG. 1 by the control flux lines 10 and 11. FIG. 1a again shows a plurality of control flux lines 10, 19, 26, 27, 28, 29. They close radially via the rotary field machine stator 3 and the rotor 1. In FIG. 1a the method of operation of the magnetic bearing force production becomes clear. The magnetic unipolar flux and the control flux reinforce one another where the two fluxes point in the same direction, at the top in FIG. 1a, and weaken one another where the fluxes point in opposite directions, at the bottom in FIG. 1a. In the region of the rotary field machine stator 3 a magnetic attraction force which is directed upwardly thus acts on the rotor 1. The magnetic attraction force in the region of the rotary field machine stator 4 likewise acts in the upward direction since here the direction of the unipolar flux and the direction of the control flux are both reversed. The magnetic attraction force acting on the rotor in the region of the rotary field machine stator, in particular in the radial direction, can now be adjust ed as desired in magnitude and direction via the control flux alone separately for each rotary field machine stator. At the unipole in which the unipolar flux leaves the rotor, i.e. in the rotary field machine stator 4 in FIG. 1, the direction of the magnetic attraction force always points in the direction of the control flux and its magnitude is proportional to the magnitude of the control flux. At the unipole in which the unipolar flux points in the direction towards the rotor, i.e. in the rotary field machine stator 3 in FIG. 1, the direction of the magnetic attraction force always points opposite to the direction of the control flux and its magnitude is proportional to the magnitude of the control flux. The radial position of the rotor 1 is measured via the position sensors 12 and 13, and 14 and 15 respectively. An excitation and control apparatus which is illustrated in FIG. 10 feeds the phase currents of the rotary field machine stators 3, 4 as a result of these measurement signals in such a manner that the rotor 1 is held in suspension.

FIG. 1b serves to clarify the terminology and shows a section through the stator 3 with a winding Lu which extends in the axial direction and is flowed through by a current and produces the two-pole magnetic field 10 which extends in the radial direction. FIG. 1c shows a further section through the stator 3 with three windings Lu, Lv, Lw which extend in the axial direction, which are separately excitable and which are designed in such a manner that a two-pole magnetic field 10 is produced. A magnetic field 10 which rotates in the direction ω about the axis 100 and which is designated as a rotary field can be produced using these three windings Lu, Lv, Lw with a corresponding excitation. The rotary frequency can also be 0 so that a magnetic field 10 extending in a predeterminable radial direction can be produced by a corresponding excitation of the windings Lu, Lv, Lw. A winding by means of which the direction of the two-pole magnetic field 10 can be predetermined, such as is illustrated e.g., for example, in FIG. 1c, is designated as a two-pole rotary field winding. In an advantageous embodiment this two-pole rotary field winding is designed as a three-phase winding with the three phases Lu, Lv, Lw as illustrated in FIG. 1c. The stators 3, 4 of FIG. 1 could have a two-pole rotary field winding 5, 6 of this kind which is designed in a three-phase manner.

Two embodiments of the magnetic bearing in accordance with the invention in which the unipolar flux is not produced by a direct current component in the rotary field machine stators 3 and 4 but rather by another first means are illustrated in FIGS. 2 and 3. In FIG. 2 the first means for the production of the unipolar flux is an axial ring coil 99 which is arranged between the two rotary field machine stators 3 and 4 and between the flux conduction rings 16 and 17 and extends concentric to the rotor 1. In FIG. 3 the first means for the production of the unipolar flux is an axially magnetized permanent magnet ring 7 which is arranged between the two rotary field machine stators 3 and 4 and between the flux conduction rings 16 and 17. In this case, as explained above, the entire unipolar flux must be conducted via the permanent magnet ring 7 and via the flux conduction rings 16 and 17. A housing of a ferromagnetic material cannot be used here. The permanent magnet ring 7 can also, as illustrated below with the permanent magnet ring 7b, lay claim to only a portion of the housing width so that a portion of the unipolar flux 9a passes via the housing 16, 17.

Figure 4:
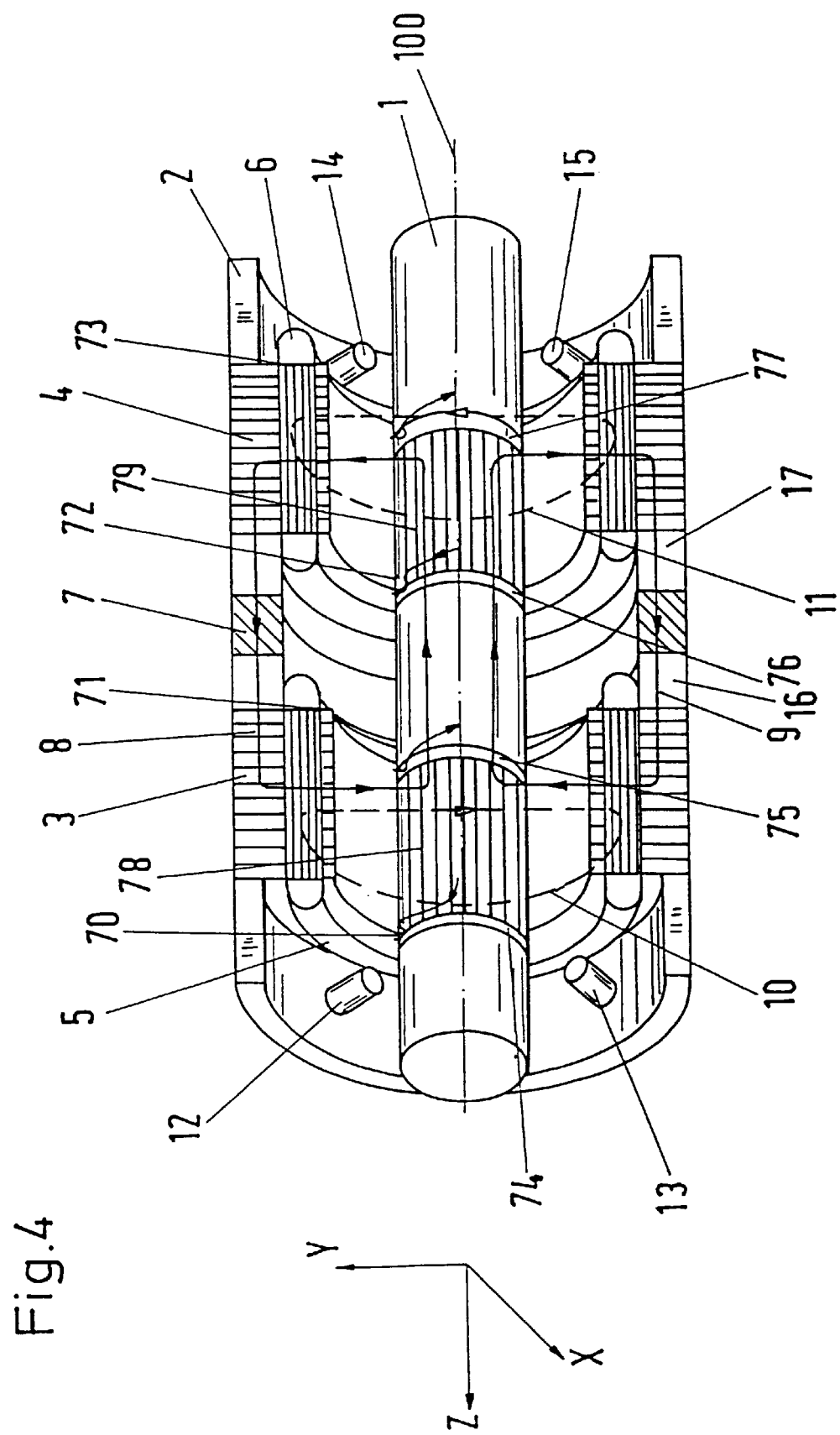
FIG. 4 illustrates a magnetic bearing apparatus in combination with a unipolar motor.

If the rotor 1 is covered in the region of the two stators 3, 4 with a direct current layer in the magnetic bearing apparatus in accordance with the invention, then it is possible to produce a torque in addition to the bearing forces in accordance with the principle of the unipolar motor. A "bearingless unipolar motor" designed in this manner is shown in FIG. 4. The direct current is conducted in via the slippers 70 and 71 and via the slip rings 74 and 75 to the rotor region beneath the left magnetic unipole in the region of the rotary field machine stator 3, or respectively via the slippers 72 and 73 and via the slip rings 76 and 77 to the rotor region beneath the right magnetic unipole in the region of the rotary field machine stator 4. The current is conducted to the rotor via an electrically conducting layer or here via rotor bars 78, 79 from the slip ring 74 to the slip ring 75 or respectively from the slip ring 76 to the slip ring 77 and forms a homogeneous current layer on the rotor regions beneath the magnetic unipoles.

Figure 5:
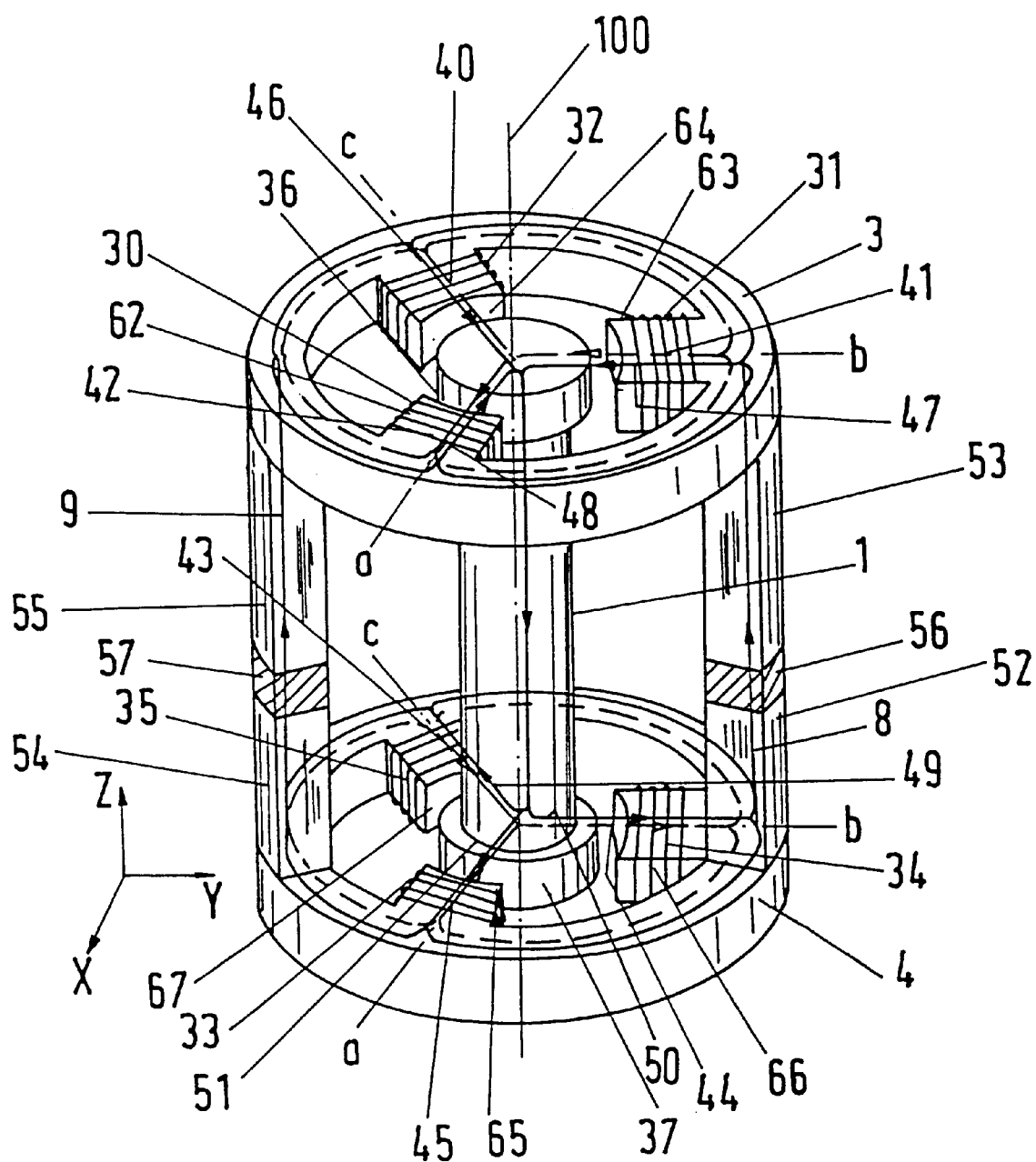
FIG. 5 illustrates an embodiment of the magnetic bearing apparatus in which the three-phase rotary current windings are built up of three discrete coils (3T winding) and in which constructional measures are provided in order to achieve a passive magnetic axial journalling of the rotor.

FIG. 5 shows a particularly simple and space-saving embodiment of the magnetic bearing apparatus in accordance with the invention. The two-pole rotary field windings 5 and 6 which are of three-phase design are formed here by only three discrete coils 30, 31 and 32, or 33, 34 and 35 respectively. An embodiment of this kind is called a 3T winding in the theory of electrical machines. The magnetic unipolar flux is produced by the axially magnetized permanent magnets 56 and 57 and is conducted by the flux conduction parts 52, 53 and 54, 55 from the rotary field machine stator 4 to the rotary field machine stator 3. Naturally it is also possible to use a permanent magnet ring and ring-shaped flux conduction parts for this. In the rotary field machine stator 3 the unipolar flux is conducted radially via the three stator teeth 62, 63, 64 to the rotor and thence further to the rotary field machine stator 4 where it leaves the rotor again radially through the stator teeth 65, 66, 67. In FIG. 5 the path of the unipolar flux in the rotary field machine stator 3 is illustrated by the unipolar flux lines 40, 41, 42 and in the rotary field machine stator 4 by the unipolar flux lines 43, 44, 45. The control flux in the rotary field machine stator 3 is produced by the three discrete coils 30, 31, 32 and is illustrated by the control flux lines 46, 47 and 48. The control flux in the rotary field machine stator 4 is produced by the three discrete coils 33, 34, 35 and is illustrated by the control flux lines 49, 50 and 51. The unipolar flux and the control flux point in the same direction along the b-axis and in opposite directions along the a-axis and the c-axis in both the rotary field machine stator 3 and the rotary field machine stator 4. Thus a resultant magnetic attraction force in the b-direction acts at both rotary field machine stators 3, 4. In the rotary field machine stator 3 the resultant magnetic attraction force thus points in the opposite direction to the control flux vector since the unipolar flux points inwards here. In the rotary field machine stator 4 the resultant magnetic attraction force points in the same direction as the control flux vector since the unipolar flux points outwards here. In the regions 36 and 37 of the rotary field machine stators 3 and 4 the rotor diameter was chosen slightly larger than in the remaining region. A passive axial magnetic bearing is thereby achieved in addition to the active radial magnetic bearing as a result of the reluctance forces.

Figure 6:
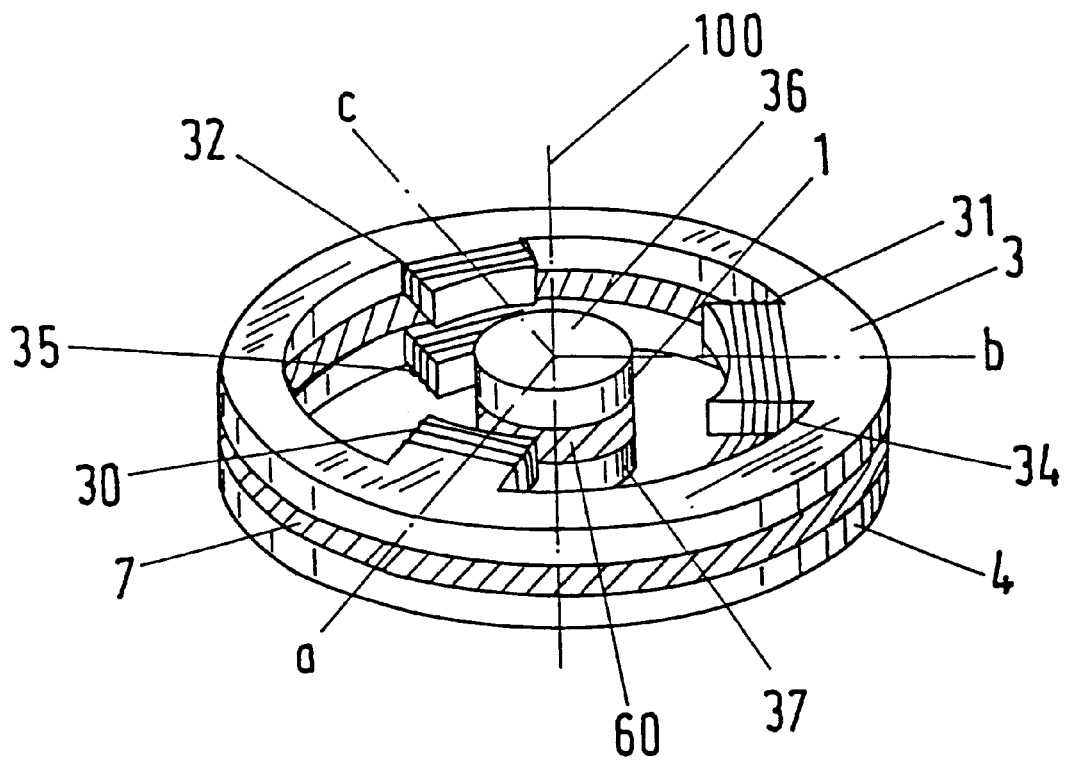
FIG. 6 illustrates a radial magnetic bearing in accordance with the principle of the magnetic bearing apparatus in which the rotary current windings of the two rotary field machine stators are connected in parallel or in series with opposite winding senses.
Figure 6A:
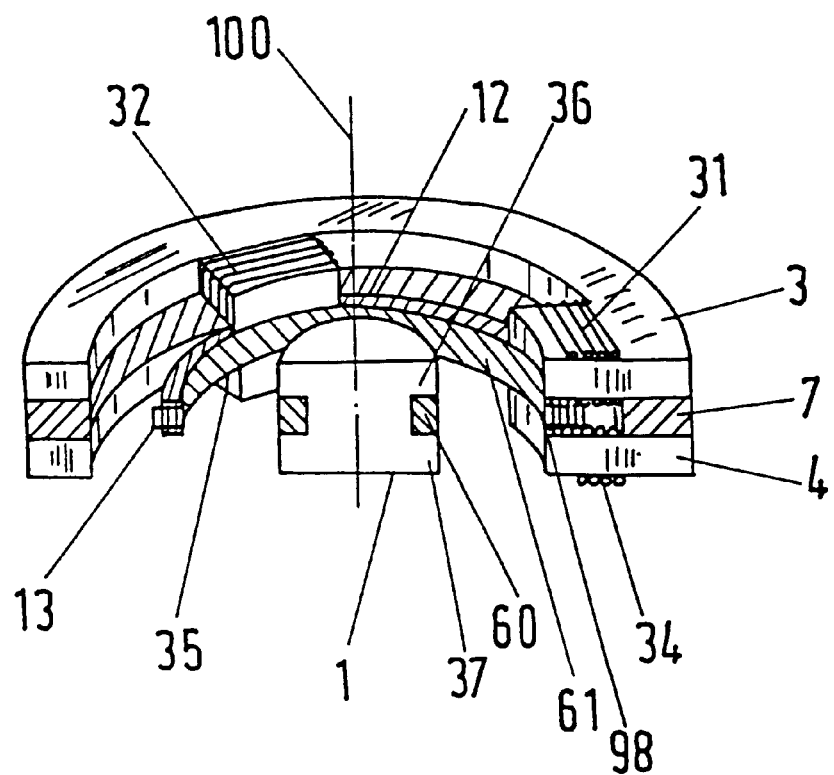
FIG. 6a illustrates a cross-section through a radial magnetic bearing in accordance with FIG. 6 with an additional sensor securing ring having position sensors, with the sensor securing ring being arranged between the two rotary current machine stators.

If the rotary current windings of the two rotary field machine stators 3, 4 are connected in parallel or in series with opposite winding senses, then the radial magnetic forces under both the stators 3, 4 always point in the same direction. An arrangement of this kind is illustrated in FIG. 6. It shows an arrangement with rotary field machine stators 3 and 4 with three discrete coils 30, 31, 32 and 33, 34, 35 in a 3T arrangement. The coil 33 is not visible in FIG. 6 for reasons of draftsmanship. An axially magnetized permanent magnet ring 7 is used for the production of the magnetic unipolar flux. The former can naturally also be formed of a plurality of permanent magnetic ring segments. Additional flux conduction rings are not required in the described embodiment but can likewise be used for the better exploitation of the magnet material. The rotor 1 has a slightly larger rotor diameter in the region 36 and 37 than in the remaining regions. As described above a passive axial magnetic bearing is thereby achieved in addition to the active radial magnetic bearing. The space between the two rotary field machine stators 3, 4, which is determined by the winding heads, can be used for the mounting of position sensors 12, 13 for the measurement of the rotor position. The distance is measured from the sensors 12, 13, which are stationary with respect to the stator, to the sensor measurement ring 60 on the rotor 1, which ring 60 lies between the two bearing regions 36 and 37. An advantage of the arrangement in accordance with FIG. 6 lies, in addition to the space saving, in the locational agreement between the position measurement and the average force development. The sensors 12, 13 themselves are not illustrated in FIG. 6 for reasons of clarity. FIG. 6*a* shows a section through the arrangement in FIG. 6 with the position sensors 12, 13 and 98. The position sensors 13, for example eddy current sensors, are mounted in a sensor mounting ring 61 which in turn is mounted between the sensor teeth. In an advantageous embodiment of the rotor 1 the latter is designed in such a manner that the rotor 1, which is designed to be ferromagnetic with the exception of the sensor measurement ring 60, has parts 36, 37 lying in the region of the rotary field machine stators 3, 4 which have a diameter greater than the remaining part of the rotor 1 in order to increase the reluctance forces acting in the axial direction when the rotor 1 deflects axially and thereby to effect a passive magnetic journalling of the rotor 1 in the axial direction.

FIG. 5*a* shows a side view of an exemplary embodiment of a radial, active magnetic bearing apparatus. The rotor 1, which is designed as a shaft, is held in suspension without contact by three discretely designed electromagnets 2*u*, 2*v*, 2*w* which are in each case respectively mutually displaced by 120° in the peripheral direction. Each electromagnet 2*u*, 2*v*, 2*w* has a coil Lu, Lv, Lw for the production of a temporally variable magnetic flux φ1, 100 2, φ3. Each coil Lu. Lv, Lw is connected via electric connection lines 3*u*, 3*v*, 3*w* to a non-illustrated rotary current controller 110. The magnetic bearing requires a bias magnetization, which is produced in the present exemplary embodiment by three coils 4*u*, 4*v*, 4*w* through which a direct current flows. At each coil core 2*u*, 2*v*, 2*w* there is arranged a coil 4*u*, 4*v*, 4*w* which is wound in the same direction. The coils 4*u*, 4*v*, 4*w* are connected to one another in a series circuit via an electrical conductor 5*a* and are therefore flowed through by a common direct current io. Furthermore, the horizontal X direction and the vertical Y direction of the bearing are illustrated as well as the forces Fx and Fy acting on the shaft 1. The individual electromagnets 2*u*, 2*v*, 2*w* are in each case arranged with a displacement of 120° in the peripheral direction of the shaft 1.

Figure 5B:
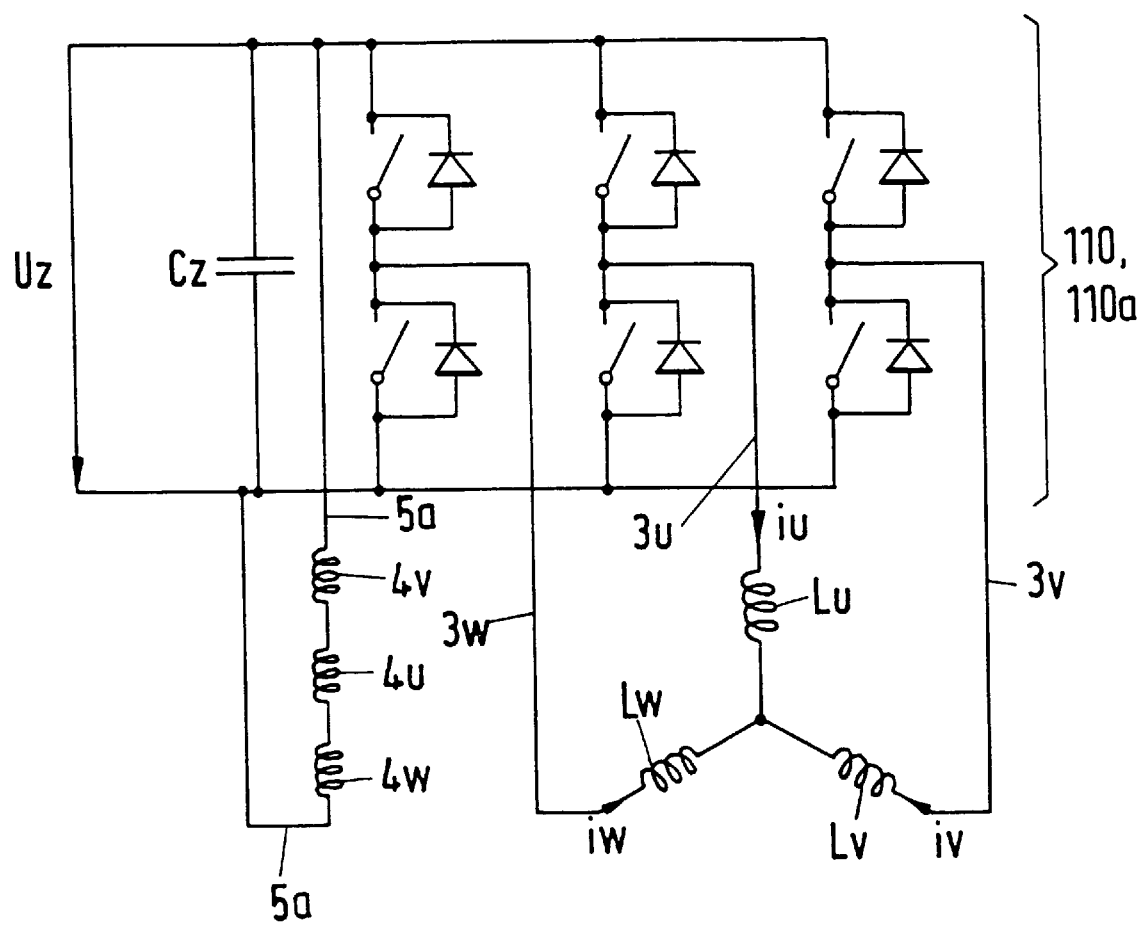
FIG. 5b illustrates an electric circuit with a three-phase rotary current controller for the excitation of the three-phase rotary field winding.

FIG. 5*b* shows the electrical connection of a three-phase rotary current controller 110 to the coils Lu, Lv, Lw of the radial, active magnetic bearing in accordance with FIG. 5*a*. The rotary current controller 110 is operated with an intermediate circuit voltage Uz and has a condenser Cz. The rotary current controller 110 comprises a power part 110*a* and a non-illustrated signal processing device 110*b* which comprises a micro-controller. The three coils Lu, Lv, Lw are connected to one another in a star circuit, with the three phase currents iu, iv, iw being supplied to the coils Lu, Lv, Lw from the power part 110*a* of the rotary current controller 110 via the electrical conductors 3*u*, 3*v*, 3*w*. The power part 110*a* has three bridge branches, each of which is connected to an electrical conductor 3*u*, 3*v*, 3*w*. In the illustrated embodiment the three coils 4*u*, 4*v*, 4*w* which produce a bias magnetization are connected in a series circuit via the electrical conductor 5 to the intermediate circuit voltage Uz so that a common current io flows through all coils 4*u*, 4*v*, 4*w*.

The relationship between the forces Fx and Fy acting on the rotor 1 and the currents iu, iv, iw present at the coils Lu, Lv, Lw is as follows:

In the following equations k represents a proportionality constant.

For the force Fx one has:

$$F_x = 2(i_u+i_o)k \cos(30°) - (i_v+i_o)k \cos(30°) - (i_w+i_o)k \cos(30°)$$

and, on collecting terms:

$$F_x = k\sqrt{3}\left(i_u - \frac{1}{2}i_v - \frac{1}{2}i_w\right) \quad \text{(I)}$$

For the force $F_y$ one has:

$$F_y = (i_v+i_o)k + (i_v+i_o)k \sin(30°) + (iu+io)k \sin(30°) - (ic+io)k - (ic+io)k \sin(30°) - (ia+io)k \sin(30°)$$

and, on collecting terms:

$$F_y = k\sqrt{3}\left(\sqrt{3}/2\, i_v - \sqrt{3}/2\, i_w\right) \quad \text{(II)}$$

For a three-phase rotary current controller 10 the auxiliary condition always holds that the sum of all currents is equal to zero. Therefore the additional relationship holds:

$$i_u + i_v + i_w = 0 \quad \text{(III)}$$

Thus in the use of a three-phase rotary current controller (equation III) for the excitation of an active, magnetic bearing the following relationship results between the currents iu, iv, iw of the individual coils Lu, Lv, Lw and the force Fx, Fy acting on the shaft 1:

$$\begin{bmatrix} i_u \\ i_v \\ i_w \end{bmatrix} = \frac{2}{3\sqrt{3}\,k} \cdot \begin{bmatrix} 1 & 0 \\ -\frac{1}{2} & \sqrt{3}/2 \\ -\frac{1}{2} & -\sqrt{3}/2 \end{bmatrix} \cdot \begin{bmatrix} F_x \\ F_y \end{bmatrix} \quad \text{(IV)}$$

It can be seen from equation IV that, when using a conventional, three-phase rotary current controller, the force Fx and Fy acting on the shaft 1 can be controlled. The two components of the force Fx, Fy are orthogonal to one another so that a force acting on the shaft 1 in any desired radial direction can be produced using these two components. Thus a total flux is produced in the magnetic bearing by the superposition of a rotary current flux on a direct current flux which enables a force acting in any desired radial direction to be produced. In this equation the condition that the sum of the currents iu, iv, iw is zero is always satisfied, so that a three-phase rotary current controller can be used.

The bias magnetization current io cancels out of the equations I to IV and need therefore no longer be taken into consideration in the regulation of the currents iu, iv, iw. The bias magnetization current io is advantageously chosen such that this current io produces about one half of the saturation flux density of the coil cores 2u, 2v, 2w.

FIG. 10 shows a three-phase rotary current controller 110 which comprises a three-phase power part 110a as well as further components 110b forming a control circuit. The rotary current controller 110 comprises in particular a programmable microprocessor which enables the respective required regulation to be programmed by a corresponding software.

The exemplary embodiment of a rotary current controller 110 illustrated in FIG. 10 has a regulator structure for the excitation of the active magnetic bearing illustrated in FIG. 5a. The bias magnetization current io is of subordinate importance and hence not illustrated. The three coils Lu, Lv, Lw of the rotary field machine stator 4 are supplied with the currents iu, iv, iw by the power part 110a. Two position sensors 12, 13 arranged on the rotary field machine stator 4 measure the respective position of the rotor 1 in the X and Y direction and produce a corresponding position signal Xist, Yist, which is fed to a comparator device. This comparator device determines the deviation between a predetermined desired value Xsoll, Ysoll and the measured actual value Xist, Yist and feeds the difference signal to a position regulator 140a, 140b which is designed as a PID regulator. The two position regulators 140a, 140b calculate the force components Fsollx, Fsolly which are required in the X and Y direction and which are to be exerted on the rotor 1 in order to bring the actual value Xist, Yist into agreement with the predetermined desired value Xsoll, Ysoll. The force components Fsollx, Fsolly are fed to a 2/3-phase transformation apparatus 130 which calculates the required desired current values isollu, isollv using equation IV. Only two current values are to be supplied to the power part 110a since the third current value is already determined by the condition that the sum of all currents is equal to zero. Current sensors 160a, 160b monitor the actual current values iIstu, iIstv, which are compared with the desired values isollu, isollv, and the difference values are fed to the current regulators 120a, 120b which are designed as PI regulators and thereupon produce the currents iu, iv via current controllers. Thus an active, magnetic bearing can be operated in a simple and economical manner with a three-phase rotary current controller 110.

The three coils Lu, Lv, Lw of the magnetic bearing apparatus of FIG. 5a are connected to one another in a star circuit in FIG. 5b. The three coils Lu, Lv, Lw could also be connected to one another in a delta circuit. The excitation apparatus 110 is to be considered as an exemplary embodiment only. The individual coils Lu, Lv, Lw can also be excited in each case by an individual current controller so that three current controllers are required for an arrangement in accordance with FIG. 5b for the excitation of the coils Lu, Lv, Lw as well as a higher level non-illustrated control apparatus.

Figure 6E:
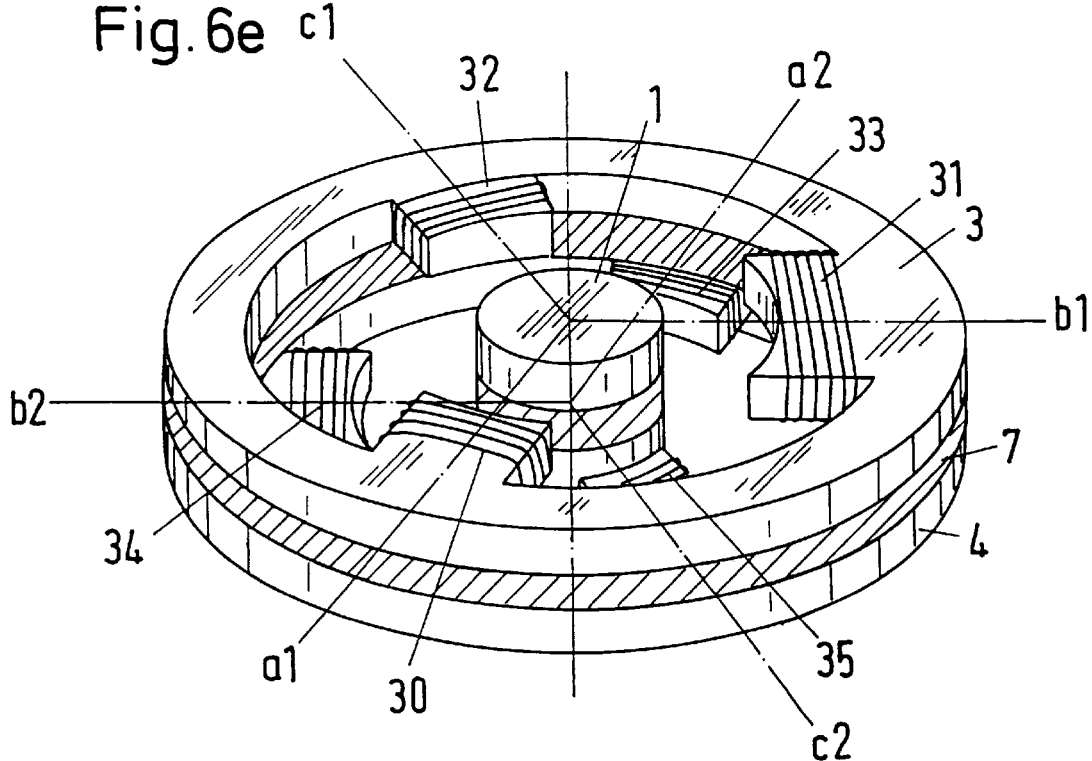
FIG. 6e illustrates a further exemplary embodiment of a magnetic bearing apparatus.
Figure 6B:
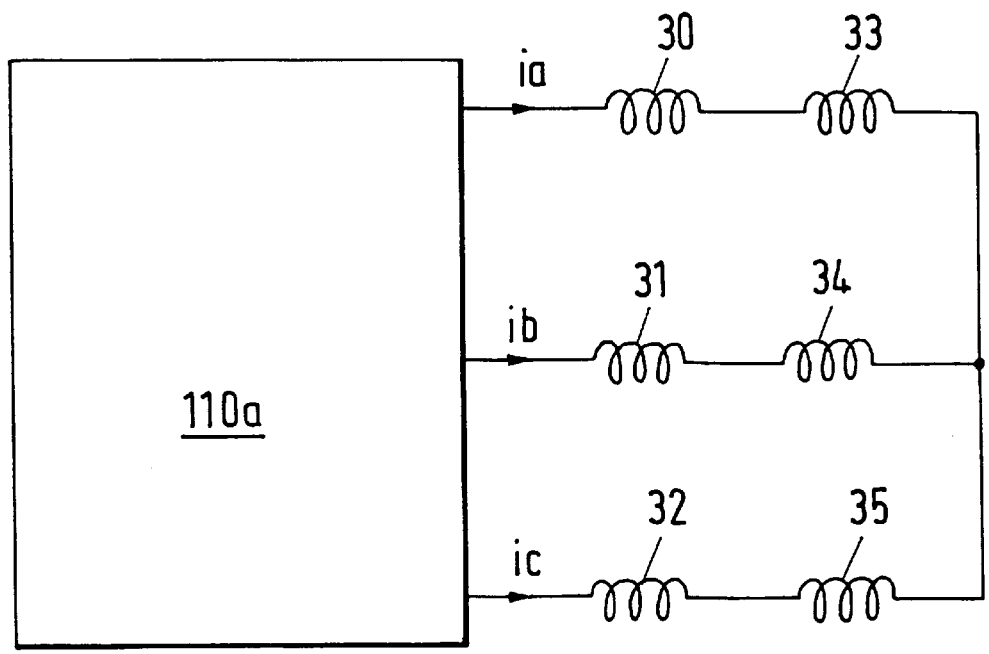
FIG. 6b illustrates an electrical circuit diagram for the excitation of the rotary field windings of the embodiment in accordance with FIG. 6.

FIG. 6b shows the electrical connection of a three-phase rotary current controller 110 to the coils 30, 31, 32, 33, 34, 35, 36 of the radial, active magnetic bearing apparatus of FIG. 6. The coils of each phase a, b, c are connected in series, with the coils 32, 35 which are connected in series being wound equally and oppositely in each case so that for example the one coil 32 produces a flux directed towards the rotor 1 and the coil 35 produces a flux leading away from the rotor 1.

Figure 6C:
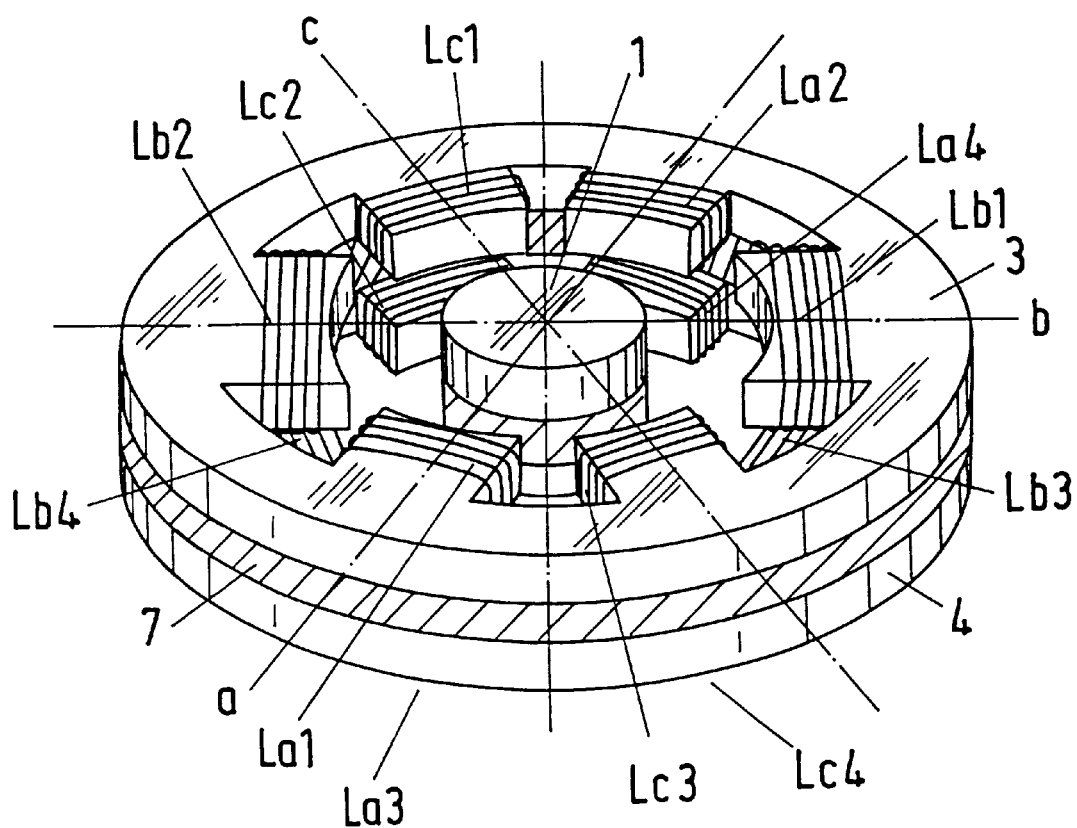
FIG. 6c illustrates a further exemplary embodiment of a magnetic bearing apparatus.
Figure 6D:
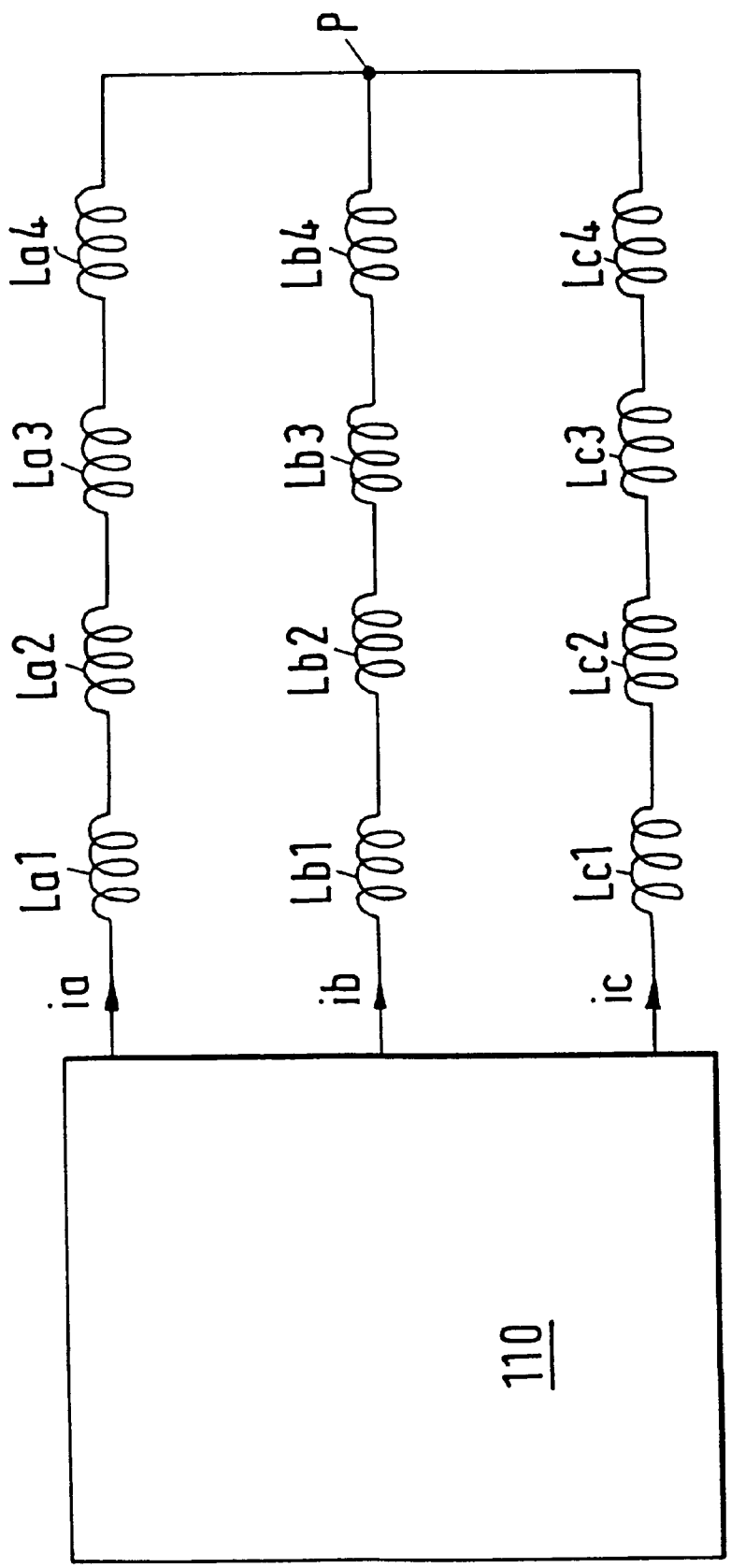
FIG. 6d illustrates an electrical circuit diagram for the excitation of the rotary field windings of the embodiment in accordance with FIG. 6c.

The magnetic bearing apparatus of FIG. 6c has, in contrast to the embodiment of FIG. 6, diametrically oppositely lying coils La1, La2; La3, La4; Lb1, Lb2; Lb3, Lb4; Lc1, Lc2; Lc3, Lc4 and teeth for each phase a, b, c so that, for example, the coils Lc1, Lc2, Lc3, Lc4 form a phase c. This arrangement of the coils and teeth leads, in comparison to the arrangement of FIG. 6, to a better, more linear distribution of the magnetic field within the air gap. In particular a deflection of the rotor 1 in the radial direction away from the central position leads in the embodiment of FIG. 6 to an asymmetrical shape of the magnetic field. This effect arises to a reduced extent in the exemplary embodiment of FIG. 6c. FIG. 6d shows the electrical connection of a three-phase rotary current controller 110 to the coils of the exemplary embodiment of FIG. 6c. The coils of a phase a, b, c are in each case connected in series; thus for example the coils La1, La2, La3, La4 of phase a are connected in series. Through the three-phase excitation of the coils with a rotary current controller 110 the individual phases a, b, c can no longer be excited independently of one another, since the auxiliary condition always holds that the sum of the currents ia, ib, ic at the star point P is equal to zero. Because a deflection of the rotor 1 in the exemplary embodiment of FIG. 6c has a lesser effect on an asymmetric distribution of the magnetic field than in the exemplary embodiment of FIG. 6, the exemplary embodiment of FIG. 6c can be more precisely excited with a rotary current controller 110. All the magnetic bearing apparatuses illustrated in the present specification can also be excited by a plurality of individual current controllers so that the exemplary embodiment of FIG. 6c can also be operated with three or six separate current controllers.

Figure 5C:
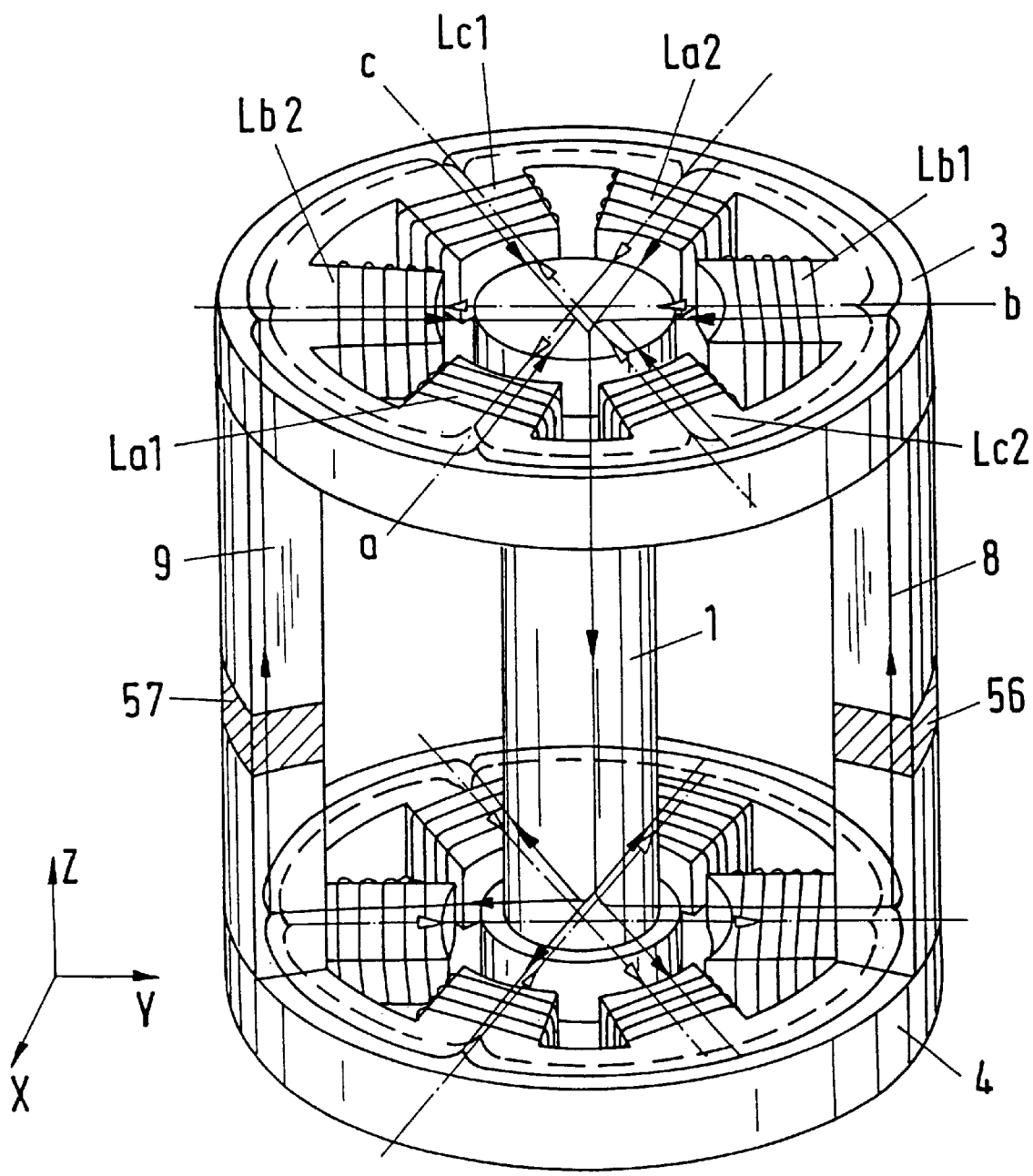
FIG. 5c illustrates a further embodiment of a magnetic bearing apparatus with a 6T winding.

The exemplary embodiment of FIG. 5c is designed similarly to the exemplary embodiment of FIG. 5, with each rotary field machine stator 3, 4 having six teeth with six corresponding coils La1, La2, Lb1, Lb2, Lc1, Lc2 which are arranged distributed in the peripheral direction, with coils La1, La2 which lie oppositely with respect to the axis of rotation being fed in each case by the same phase a, b, c. In the exemplary embodiment of FIG. 5c each rotary field machine stator 3, 4 is excited by a separate rotary current controller 110 so that the position of the rotor 1 can be controlled and regulated at both rotary field machine stators 3, 4.

A further exemplary embodiment of a magnetic bearing apparatus with two rotary field machine stators 3, 4 each having three teeth which are arranged to be distributed in the peripheral direction and having discrete coils 30, 31, 32, 33, 34, 35 is illustrated in FIG. 6e. The coils 30, 31, 32; 33, 34, 35 of each phase a1, b1, c1; a2, b2, c2 are respectively mutually displaced by 120° in the peripheral direction in each rotary field machine stator 3, 4, with the coils 30, 31, 32; 33, 34, 35 of the two rotary field machine stators 3, 4 additionally being respectively mutually displaced by 60° in the peripheral direction. This arrangement produces, in comparison with the exemplary embodiment of FIG. 6, a more homogeneous distribution of the magnetic field in the space between the stators 3, 4 and the rotor 1, in particular for a deflection of the rotor 1 in the radial direction away from the central position.

Figure 6F:
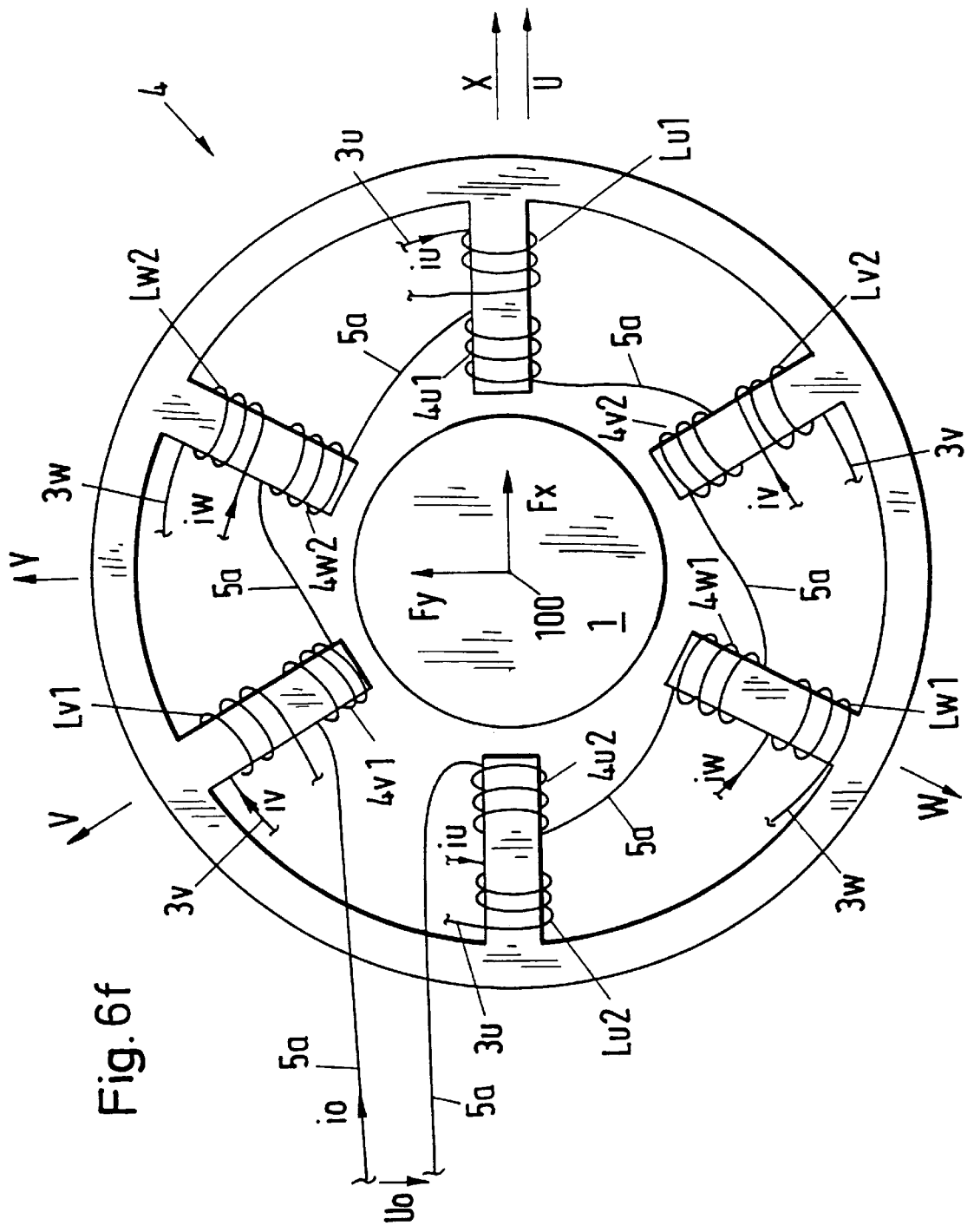
FIG. 6f illustrates a further exemplary embodiment of a magnetic bearing apparatus.

FIG. 6f shows a further exemplary embodiment of a rotary field machine stator 4 which is otherwise built up similarly to the exemplary embodiment of FIG. 5a and has six teeth with coils Lu1, Lu2, Lv1, Lv2, Lw1, Lw2 which are distributed in the peripheral direction. The coils Lu1, Lu2; Lv1, Lv2; Lw1, Lw2 which are arranged to lie oppositely with respect to the center of rotation 100 form a phase and are electrically connected in series. In addition each tooth has a coil 4u1, 4u2, 4v1, 4v2, 4w1, 4w2 wound in the same sense for the production of the unipolar flux, with these coils being connected in series to a direct current source Uo via an electrical conductor 5a.

Figure 7:
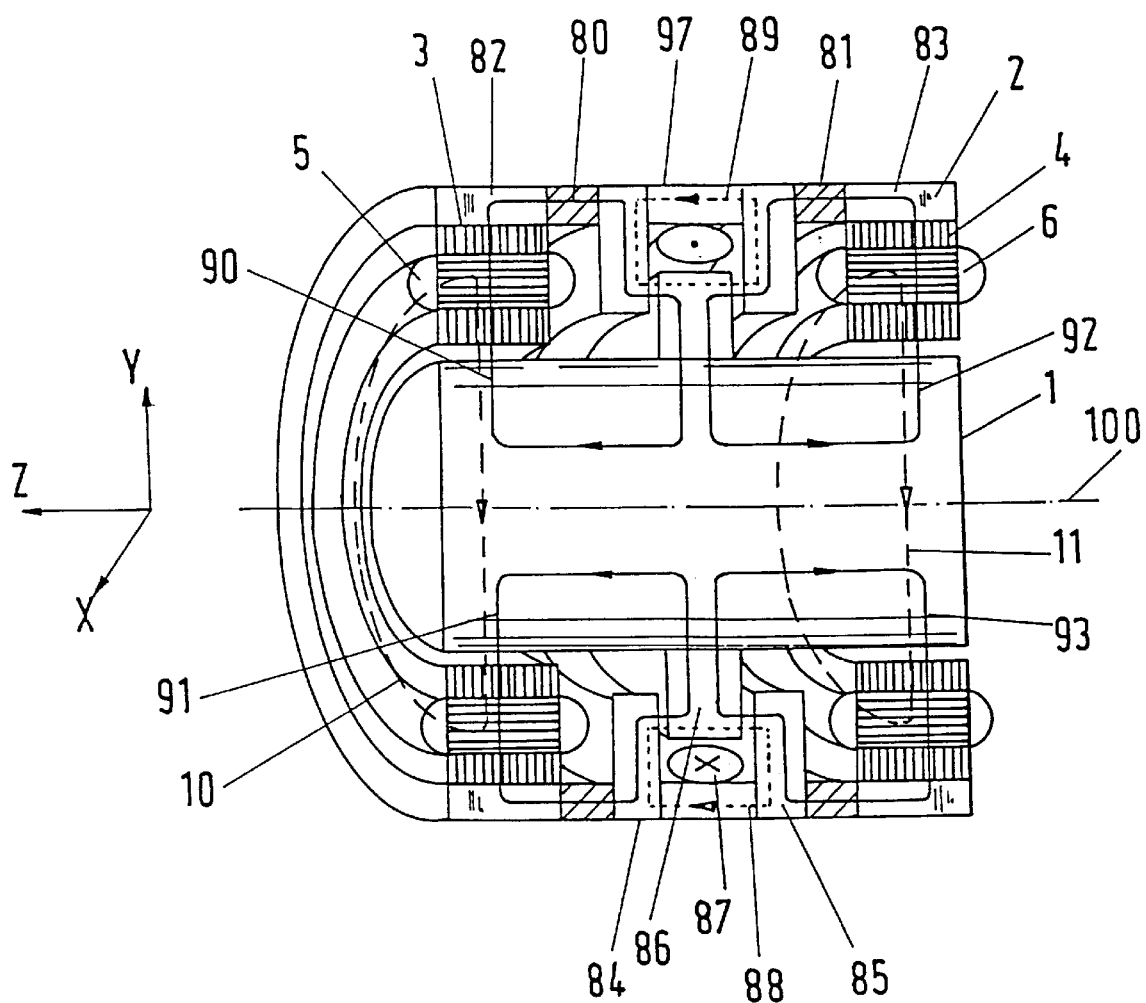
FIG. 7 illustrates a magnetic bearing apparatus with an additional magnetic bearing which can be excited in the axial direction.

FIG. 7 shows an arrangement for the active magnetic journalling of a rotor 1 using the principle in accordance with the invention with an additional active axial magnetic bearing. For this, two separate unipolar flux circuits which are directed oppositely to one another and illustrated by the unipolar flux lines 90 and 91 or 92 and 93 respectively are built up for the two rotary field machine stators 3 and 4. The two unipolar fluxes are produced via two separate axially magnetized permanent magnet rings 80 and 81 with opposite directions of magnetization. The two mutually opposite unipolar fluxes 90, 91 and 92, 93 are axially conducted via the flux conduction elements 84 and 85 in the stator 2 into an axial bearing disc 86 which is firmly connected to the rotor 1 and is thence guided radially to the rotor 1. The unipolar fluxes are further closed via the vice, the rotary field machine stators 3 and 4, and via any possibly present flux conduction rings 82, 83 to the permanent magnet rings 80 and 81. In accordance with the invention, as described above, radial magnetic bearing forces are produced via the rotary field machine stators 3 and 4 with the help of the two-pole rotary field windings 5 and 6 through the superposition of radial control fluxes 10, 11 on the unipolar fluxes. A further control flux, a so-called axial control flux, illustrated by the flux lines 88 and 89, is produced via an additional axial ring coil 87 which is arranged to extend concentric to the rotor 1. The axial control flux closes via the flux conduction ring 97, via the flux conduction elements 84 and 85, and axially via the axial bearing disc 86. The two unipolar fluxes 90, 92 enter perpendicularly into the axial bearing disc 86 at both sides. The axial control flux enters perpendicularly into the axial bearing disc 86 on the left side and departs again perpendicularly out of the axial bearing disc 86 on the right side. On the left side of the axial bearing disc 86 the axial control flux, illustrated by the flux lines 88 and 89, thus reinforces the unipolar flux, illustrated by the unipolar flux lines 90 and 91. On the right side the axial control flux, illustrated by the flux lines 88 and 89, weakens the unipolar flux, illustrated by the unipolar flux lines 92 and 93. An axially directed magnetic attraction force acts on the axial bearing disc 86 in the direction of the higher flux density, which means to the left in FIG. 7. It can be controlled via the current in the axial ring coil 87 with respect to magnitude and sign. An active axial magnetic journalling of the rotor 1 is enabled through a higher level position regulation.

Figure 7C:
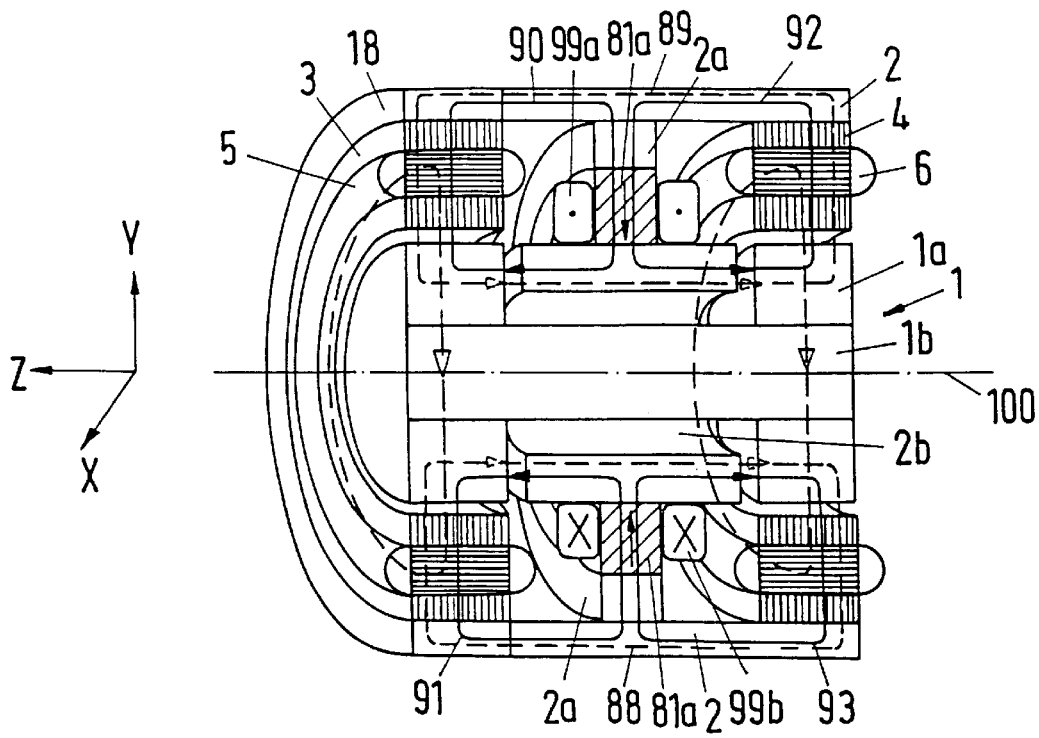
FIGS. 7b, 7c illustrate further embodiments of a magnetic bearing apparatus with an additional magnetic bearing which can be excited in the axial direction.
Figure 7B:
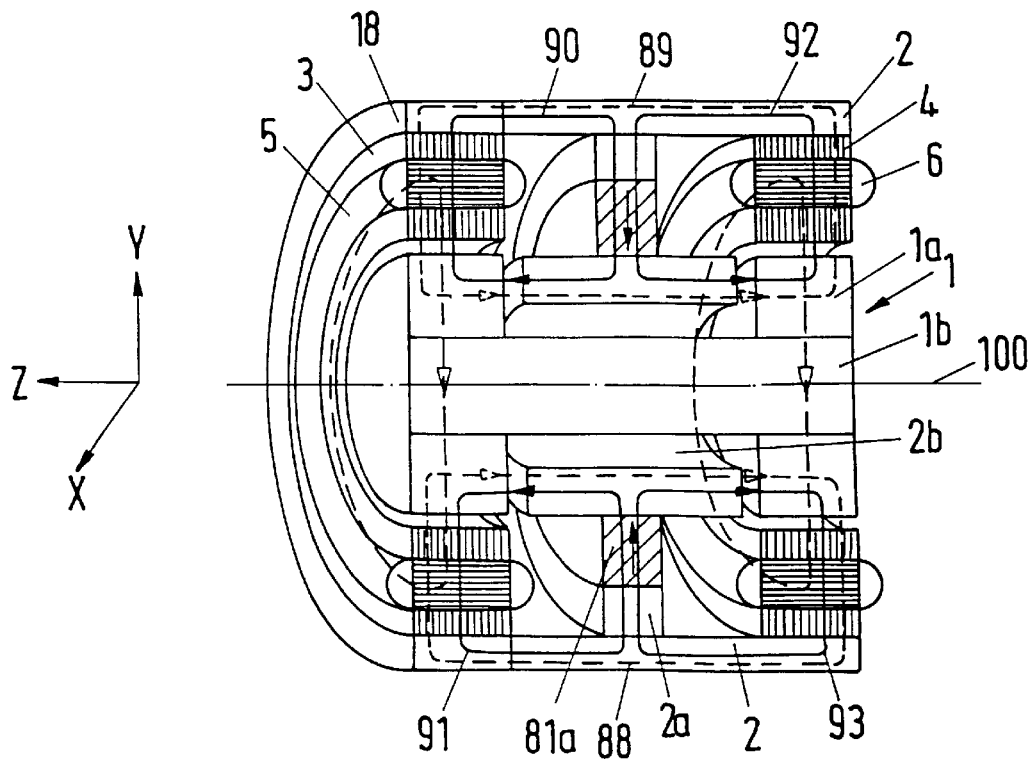

FIG. 7b is a sectional drawing of a further arrangement for the active magnetic journalling of a rotor 1 with an additional active axial magnetic bearing. Two rotary field machine stators 3, 4 which are spaced in the axial direction are connected via a ferromagnetic housing 18 to one another and form a stator 2. A permanent magnet 81a which is magnetized in the radial direction and which is connected via a ring-shaped ferromagnetic flux conduction part 2a to the housing 18 is arranged between the rotary field machine stators 3, 4. Furthermore, the permanent magnet 81a is connected towards the rotor 1 to a cylindrical ferromagnetic flux conduction part 2b extending in the axial direction. The flux conduction part 2b can also be manufactured of a laminated material. The rotor 1 consists of a non-ferromagnetic shaft 1b to which a ferromagnetic, cylindrical part 1a is firmly connected at both ends. The permanent magnet 81a produces two separate unipolar flux circuits, illustrated by the four unipolar flux lines 90, 91, 92, 93, with a flux circuit in each case starting from the permanent magnet 81a and passing in the axial direction via the cylindrical flux conduction part 2b and an air gap to the rotor part 1a, then passing in the radial direction via the air gap into the rotary field machine stator 3, 4, and further via the housing 18 and the flux conduction part 2a back to the permanent magnet 81a. The control flux 88, 89 is produced by a direct current component in the coils of the rotary field machine stators 3, 4, with a weakening of the axially directed magnetic field resulting between the rotary field machine stator 3 and the flux conduction part 2b in the illustrated exemplary embodiment through the superposition of the control flux 88, 89 with the unipolar flux 90, 91, 92, 93 and a strengthening of the axially directed magnetic field resulting between the rotary field machine stator 4 and the flux conduction part 2b, which produces a force on the rotor 1 acting to the right in the axial direction. Thus the position of the rotor 1 can be controlled as desired in both axial directions with a correspondingly designed control device with sensors. In the exemplary embodiment of FIG. 7b all five degrees of freedom of the rotor 1 can be controlled, namely the x and y direction of each rotary field machine stator 3, 4 and the z direction of the rotor 1.

The exemplary embodiment of FIG. 7c differs from that of FIG. 7b insofar as the control flux 88, 89 is not produced by the coils of the rotary field machine stator 3, 4, but rather by an axial coil 99a, 99b surrounding the cylindrical flux conduction part 2b. The control flux 88, 89, which extends in the axial direction in the flux conduction part 2b, is produced by this axial coil 99a, 99b. The coils of the rotary field machine stators 3, 4 can thereby be operated without a superimposed direct current component so that these coils can be excited by a three-phase rotary current controller. The position of the rotor 1 in the axial direction can be controlled via the axial coils 99a, 99b.

Figure 8:
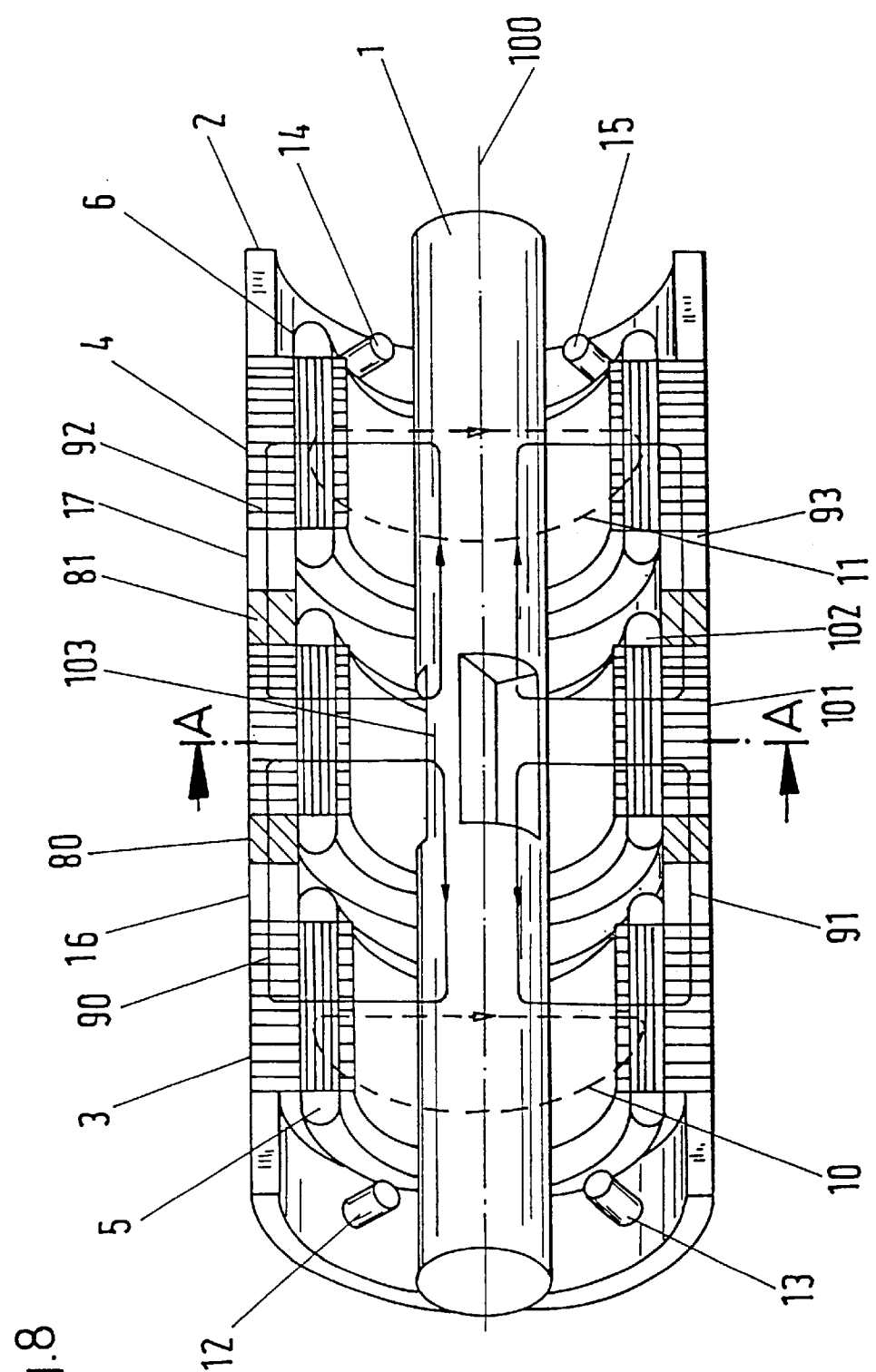
FIG. 8 illustrates a magnetic bearing apparatus in combination with a switched reluctance motor which is biased by a magnetic unipolar flux.

FIG. 8 shows the magnetic bearing apparatus in accordance with the invention in combination with a switched reluctance motor (designated in English as a "permanent magnet biased switched reluctance motor") which is magnetically biased by the unipolar flux, with it being possible to consider this motor as a synchronous reluctance motor or a stepping motor. For this, two separate mutually oppositely directed unipolar flux circuits, illustrated by the unipolar flux lines 90 and 91 or 92 and 93 respectively, are likewise built up for the rotary field machine stators 3 and 4. In contrast to FIG. 7 the two unipolar flux circuits are conducted so as to pass in the radial direction to the rotor region of the reluctance motor 103 via a reluctance motor stator 101 arranged between the two rotary field machine stators 3 and 4 and the axially magnetized permanent magnet rings 80 and 81. The reluctance motor is magnetically biased by the unipolar flux. In accordance with the invention, as described above, radial magnetic bearing forces are produced via the rotary field machine stators 3 and 4 with the help of the rotary field windings 5 and 6 through superposition of the radial control fluxes 10, 11 on the unipolar flux.

FIG. 8a shows a cross-section along the line A—A through a reluctance motor in accordance with FIG. 8 with a 4-pole rotor. In the stator 101, conductors 102a are arranged perpendicular to the plane of view which together form the winding 102. The rotor region 103 of the reluctance motor has the illustrated cross-section. Reluctance motors with different pole numbers and designs, e.g. stepping motors, can naturally also be used.

Figure 9:
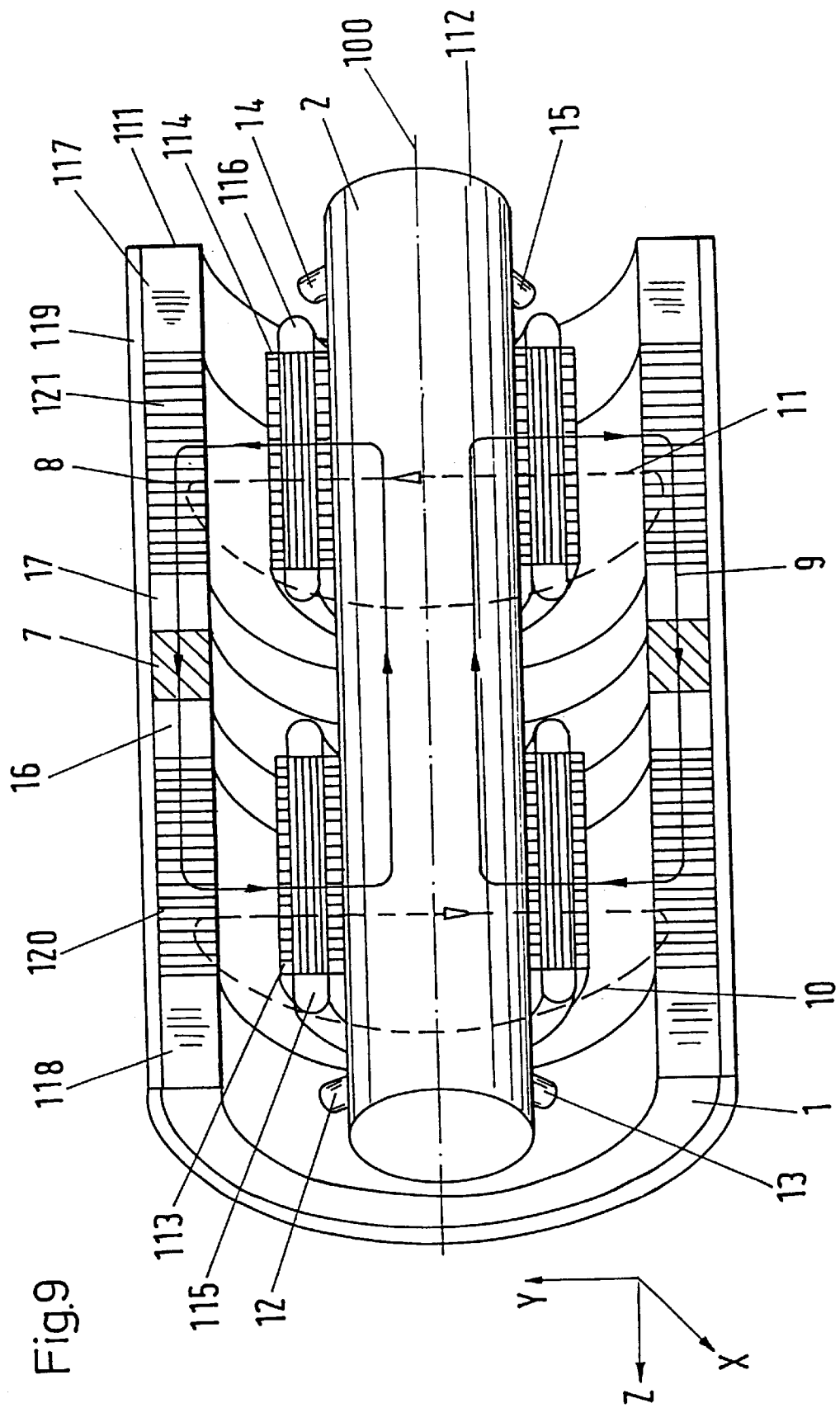
FIG. 9 illustrates a magnetic bearing apparatus with an outer rotor and an inner stator.

Naturally it is also possible to arrange the means for the production of the unipolar flux, in particular permanent magnets, in the rotor itself for all exemplary embodiments discussed. Furthermore, it is also possible to design the bearing in accordance with the invention with rotary field motor inner stators and outer rotors. FIG. 9 shows an embodiment of the magnetic bearing apparatus in accordance with the invention of this kind with an outer rotor 111 and an inner stator 112. The unipolar flux, illustrated by the two unipolar flux lines 8 and 9, is produced here by an axially magnetized permanent magnet ring 7 which is provided in the rotor 1. It is conducted via flux conduction rings 16, 17 and via laminated rotor packs 120, 121 from the rotor 1 to the rotary field machine stators 2 in an internal stator design 113, 114 and closes in the internal stator 112 consisting of a ferromagnetic material. The two control fluxes, illustrated by the control flux lines 10 and 11, can be controlled in magnitude and direction by the rotary current windings 115 and 116. The generation of the magnetic bearing force then takes place as described above.

If a plurality of bearing systems in accordance with FIG. 9 are combined and built into a hollow shaft, then the bending deflection of the hollow shaft can be influenced via the different bearing positions.

Figure 11A:
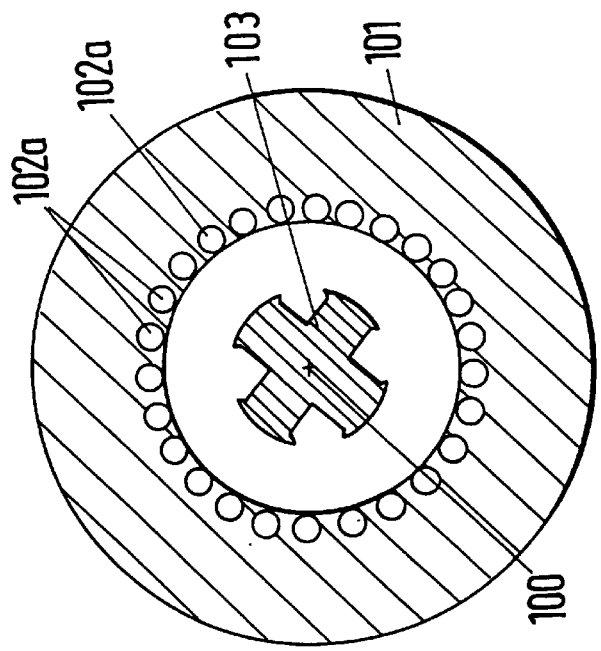
FIGS. 11a, 11b, 11c illustrate exemplary embodiments of saturation locations for the limitation of the unipolar magnetic flux.
Figure 11A:
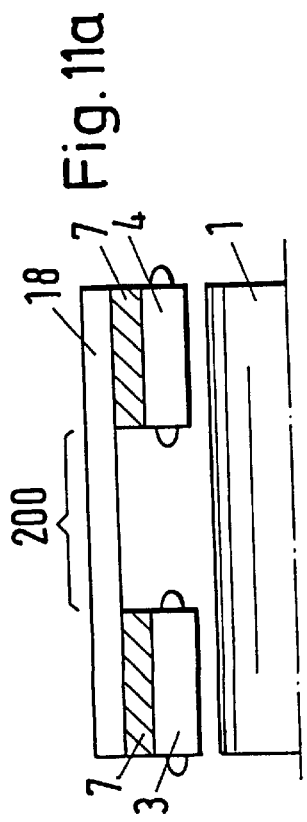
Figure 11B:
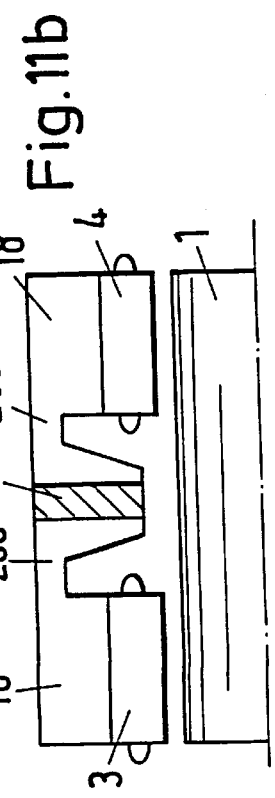
Figure 11C:
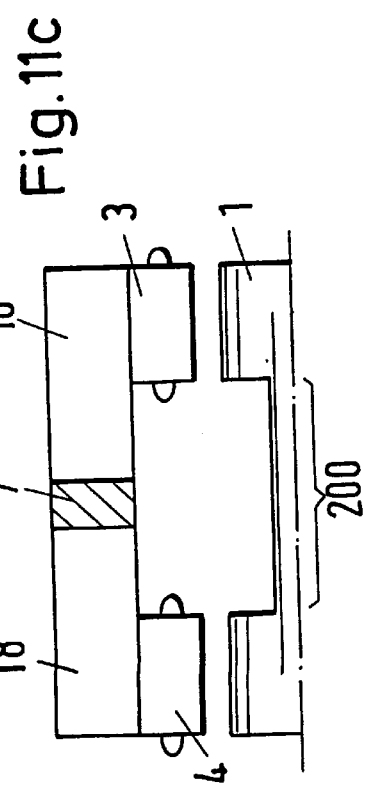

FIGS. 11a, 11b, 11c each show a longitudinal section through a magnetic bearing apparatus with built-in saturation locations 200 in order to limit the magnetic flux of a unipolar circuit. Locations 200 of this kind can be advantageous if the bearing apparatus has permanent magnets 7. If for example the rotor 1 makes direct contact with the rotary field machine stator 3, 4, then the entire unipolar flux flows via this contact point, which has a very high magnetic flux with correspondingly large magnetic holding forces as a consequence. The saturation locations 200 are arranged in the unipolar circuit in order to limit the flux in the unipolar flux circuit. Saturation locations of this kind are arranged in the magnetic bearing apparatus in such a manner that no saturation location 200 comes to lie in the control flux circuit, but rather that the saturation locations 200 come to lie exclusively in parts through which only the unipolar flux circuit flows, in order to limit only the magnetic flux of the unipolar flux circuit in this manner. In the exemplary embodiment of FIG. 11a the rotary field machine stators 3, 4 are connected via a permanent magnet 7 to the housing 18, with the wall thickness of the housing being designed in such a manner that a saturation location 200 results between the rotary field machine stators 3, 4. In the exemplary embodiment of FIG. 11b the housing 18 consists of two parts with a permanent magnet which is arranged in the center in the axial direction and is polarized in the axial direction, with the housing 18 having two narrowed locations 200, each of which forms a saturation location 200. In the exemplary embodiment of FIG. 11c the rotor 1, which extends in the axial direction, has a region 200 with a reduced cross-section which forms a saturation location 200. These illustrated exemplary embodiments are only one possibility out of a large number of possibilities of arranging a saturation location in a magnetic bearing apparatus in such a manner that only the magnetic flux of the unipolar flux circuit is limited.

What is claimed is:

1. A magnetic Maxwell-bearing apparatus for a magnetizable body, the apparatus comprising:
    a stator including at least two rotary field machine stators, each rotary field machine stator having a two-pole rotary field winding of three-phase design; and
    means for producing a unipolar flux in the rotary field machine stators.

2. A magnetic Maxwell-bearing apparatus in accordance with claim 1 further comprising means for coupling the rotary field machine stators to one another magnetically.

3. A magnetic Maxwell-bearing apparatus in accordance with claim 1 wherein the means comprises at least one of the two-pole rotary field windings having a direct current component applied thereto.

4. A magnetic Maxwell-bearing apparatus in accordance with claim 1 wherein the means comprises a ring coil or a permanent magnet disposed between the rotary field machine stators.

5. A magnetic Maxwell-bearing apparatus in accordance with claim 1 wherein each of the rotary field machine stators has three grooves and three teeth, and wherein each of the two-pole rotary field windings of three-phase design includes three discrete coils wound respectively on the three teeth.

6. A magnetic Maxwell-bearing apparatus in accordance with claim 1 wherein each of the rotary field machine stators has six grooves and six teeth, and wherein each of the two-pole rotary field windings of three-phase design includes six discrete coils wound respectively on the six teeth.

7. A magnetic Maxwell-bearing apparatus in accordance with claim 1 further comprising a rotor as the magnetizable body, the rotor having a portion lying in the region of the rotary field machine stators, the portion having a diameter greater than the remaining portions of the rotor.

8. A magnetic Maxwell-bearing apparatus in accordance with claim 1 further comprising a rotor as the magnetizable body, the rotor being an inner rotor disposed inwardly of the stator or an outer rotor lying outwardly around the stator.

9. A magnetic Maxwell-bearing apparatus in accordance with claim 1 wherein the unipolar flux in the rotary field machine stators has a unipolar flux circuit with a saturation point.

10. A magnetic Maxwell-bearing apparatus in accordance with claim 1 further comprising a rotary current winding having a number of pole pairs greater than or equal to three and being arranged in at least one of the rotary field machine stators.

11. A magnetic Maxwell-bearing apparatus in accordance with claim 1 further comprising a drive device for driving the magnetizable body in accordance with the principle of a unipolar motor.

12. A magnetic Maxwell-bearing apparatus in accordance with claim 1 wherein two rotary field machine stators form a magnetic radial bearing unit, and wherein corresponding phases of the two-pole rotary field windings are electrically connected in parallel or in series with opposite winding senses.

13. A magnetic Maxwell-bearing apparatus in accordance with claim 1 further comprising at least one position sensor disposed between the rotary field machine stators for measuring the position of the magnetizable body.

14. A magnetic Maxwell-bearing apparatus in accordance with claim 1 further comprising a rotor as the magnetizable body having an axis; an axial bearing disc of a ferromagnetic material which is firmly connected to the rotor and arranged to extend between two rotary field machine stators to enable two separate, mutually oppositely directed unipolar flux circuits for the two rotary field machine stators, with two unipolar fluxes extending in the rotor in opposite directions; and a ring coil extending concentrically to the rotor and being arranged in the stator to produce an axial control flux which closes in the axial direction via the axial bearing disc.

15. A magnetic Maxwell-bearing apparatus in accordance with claim 1 further comprising two separate, mutually oppositely directed unipolar flux circuits for two rotary field machine stators, the two unipolar flux circuits having a common unipole; and a reluctance motor being magnetically biased by two unipolar fluxes, the common unipole being connected via the reluctance motor.

16. A method for operation of a magnetic Maxwell-bearing apparatus in accordance with claim 1, the method comprising:
   selecting a preset desired value for the position of the magnetizable body in an x-direction and a y-direction;
   measuring the position of the magnetizable body in the x-direction and the y-direction using a position sensor;
   calculating a control deviation in the x-direction and the y-direction;
   calculating current values using a 2/3-phase transformation for a setting apparatus;
   feeding the control deviation and the current values to the setting apparatus so that the two-pole rotary field windings of three-phase design are supplied with current in such a manner that the position of the magnetizable body corresponds to the preset desired value.

17. The method of claim 16 wherein the setting apparatus comprises a three-phase rotary current controller.

18. A magnetic Maxwell-bearing apparatus for a magnetizable body the apparatus comprising:
   a stator including at least one rotary field machine stator for supporting the magnetizable body, the rotary field machine stator having a three-phase rotary field winding for producing a two-pole magnetic field extending in a radial direction with respect to the rotary field machine stator; and
   means for producing a unipolar flux in the at least one rotary field machine stator.

19. A magnetic Maxwell-bearing apparatus in accordance with claim 18 further comprising a three-phase rotary current controller for excitation of the three-phase rotary field winding.

20. A magnetic Maxwell-bearing apparatus in accordance with claim 18 wherein the magnetizable body comprises a rotatable shaft.

21. A magnetic Maxwell-bearing apparatus for a magnetizable rotatable shaft, the apparatus comprising:
   a stator including at least one rotary field machine stator, each rotary field machine stator having a two-pole rotary field winding; and
   means for producing a unipolar flux in the at least one rotary field machine stator.

22. A magnetic Maxwell-bearing apparatus in accordance with claim 21 wherein the stator includes at least two rotary field machine stators for supporting the magnetizable rotatable shaft, the rotary field machine stators each having a two-pole rotary field winding of three-phase design for producing a two-pole magnetic field extending in a radial direction with respect to the respective rotary field machine stators.

23. A magnetic Maxwell-bearing apparatus in accordance with claim 22 further comprising means for coupling the rotary field machine stators to one another magnetically.

24. A magnetic Maxwell-bearing apparatus in accordance with claim 21 wherein the two-pole rotary field winding comprises a three-phase rotary field winding and further comprising a three-phase rotary current controller for excitation of the three-phase rotary field winding.

25. A magnetic Maxwell-bearing apparatus in accordance with claim 21 wherein the means comprises at least one of the two-pole rotary field windings having a direct current component applied thereto.

26. A magnetic Maxwell-bearing apparatus in accordance with claim 21 wherein the means comprises a ring coil or a permanent magnet disposed between the rotary field machine stators.

27. A magnetic Maxwell-bearing apparatus in accordance with claim 21 wherein each rotary field machine stator has three grooves and three teeth, and wherein each of the two-pole rotary field windings of three-phase design includes three discrete coils wound respectively on the three teeth.

28. A magnetic Maxwell-bearing apparatus in accordance with claim 21 wherein each rotary field machine stator has six grooves and six teeth, and wherein each of the two-pole rotary field windings of three-phase design includes six discrete coils wound respectively on the six teeth.

29. A magnetic Maxwell-bearing apparatus in accordance with claim 21 wherein the rotatable shaft has a portion lying in the region of the rotary field machine stator, the portion having a diameter greater than the remaining portions of the rotatable shaft.

30. A magnetic Maxwell-bearing apparatus in accordance with claim 21 wherein the rotatable shaft is an inner shaft disposed inwardly of the stator or an outer shaft lying outwardly around the stator.

31. A magnetic Maxwell-bearing apparatus in accordance with claim 21 wherein the unipolar flux in the rotary field machine stators has a unipolar flux circuit with a saturation point.

32. A magnetic Maxwell-bearing apparatus in accordance with claim 21 further comprising a rotary current winding having a number of pole pairs greater than or equal to three and being arranged in at least one rotary field machine stator.

33. A magnetic Maxwell-bearing apparatus in accordance with claim 21 further comprising a drive device for driving the rotatable shaft in accordance with the principle of a unipolar motor.

34. A magnetic Maxwell-bearing apparatus in accordance with claim 21 wherein two rotary field machine stators form a magnetic radial bearing unit, and wherein corresponding phases of the two-pole rotary field windings are electrically connected in parallel or in series with opposite winding senses.

35. A magnetic Maxwell-bearing apparatus in accordance with claim 21 further comprising at least one position sensor disposed between two rotary field machine stators for measuring the position of the rotatable shaft.

36. A magnetic Maxwell-bearing apparatus in accordance with claim 21 further comprising an axial bearing disc of a ferromagnetic material which is firmly connected to the rotatable shaft and arranged to extend between two rotary field machine stators to enable two separate, mutually oppositely directed unipolar flux circuits for the two rotary field machine stators, with two unipolar fluxes extending in the rotatable shaft in opposite directions; and a ring coil extending concentrically to the rotatable shaft and being arranged in the stator to produce an axial control flux which closes in the axial direction via the axial bearing disc.

37. A magnetic Maxwell-bearing apparatus in accordance with claim 21 further comprising two separate, mutually oppositely directed unipolar flux circuits for two rotary field machine stators, the two unipolar flux circuits having a common unipole; and a reluctance motor being magnetically biased by two unipolar fluxes, the common unipole being connected via the reluctance motor.

38. A method for operation of a magnetic Maxwell-bearing apparatus in accordance with claim 21, the method comprising:

selecting a preset desired value for the position of the rotatable shaft in an x-direction and a y-direction;

measuring the position of the rotatable shaft in the x-direction and the y-direction using a position sensor;

calculating a control deviation in the x-direction and the y-direction;

calculating current values using a 2/3-phase transformation for a setting apparatus;

feeding the control deviation and the current values to the setting apparatus so that the two-pole rotary field winding is supplied with current in such a manner that the position of the rotatable shaft corresponds to the preset desired value.

39. The method of claim 38 wherein the two-pole rotary field winding is of three-phase design.

40. The method of claim 39 wherein the setting apparatus comprises a three-phase rotary current controller.

* * * * *